US008356005B2

(12) United States Patent
Reimer

(10) Patent No.: US 8,356,005 B2
(45) Date of Patent: *Jan. 15, 2013

(54) IDENTIFYING EVENTS

(75) Inventor: John Reimer, San Jose, CA (US)

(73) Assignee: John Reimer, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/803,766

(22) Filed: Jul. 6, 2010

(65) Prior Publication Data

US 2011/0047174 A1 Feb. 24, 2011

Related U.S. Application Data

(63) Continuation of application No. 11/490,905, filed on Jul. 21, 2006, now Pat. No. 7,761,400.

(60) Provisional application No. 60/701,551, filed on Jul. 22, 2005.

(51) Int. Cl.
*G06F 15/00* (2006.01)
*G06F 15/18* (2006.01)

(52) U.S. Cl. ............... 706/62; 706/45; 706/46; 706/47; 706/48

(58) Field of Classification Search ................ None
See application file for complete search history.

(56) References Cited

U.S. PATENT DOCUMENTS

| 2,252,487 A | 8/1941 | Bevill |
| 3,962,861 A | 6/1976 | Protta et al. |
| 4,010,603 A | 3/1977 | Forsyth |
| 4,903,336 A | 2/1990 | Masuhara et al. |
| 5,539,635 A | 7/1996 | Larson, Jr. et al. |
| 5,867,488 A | 2/1999 | Derango et al. |
| 5,937,413 A | 8/1999 | Hyun et al. |
| 5,991,737 A | 11/1999 | Chen |
| 6,029,141 A | 2/2000 | Bezos et al. |
| 6,578,047 B1 * | 6/2003 | Deguchi ............... 1/1 |
| 6,650,534 B2 | 11/2003 | Tree |
| 6,674,993 B1 | 1/2004 | Tarbouriech |
| 6,829,368 B2 | 12/2004 | Meyer et al. |

(Continued)

FOREIGN PATENT DOCUMENTS

WO       WO 00/41090 A1     7/2000

(Continued)

OTHER PUBLICATIONS

Title: AroundMe: iPhone Application URL: http://itunes.apple.com/us/app/aroundme/id290051590?mt=8 Date: May 5, 2011; 2 pages.

(Continued)

*Primary Examiner* — Omar Fernandez Rivas
*Assistant Examiner* — Luis Sitiriche
(74) *Attorney, Agent, or Firm* — David Lewis

(57) ABSTRACT

Events may be identified by storing information in response to activating an event stamp function. As a result of activating the event function, the information collected may immediately be compared to event information in a database. Alternatively, the information collected may later be compared to event information in a database. One or more candidates for the event of interest may be automatically or manually retrieved, and the user may decide whether a candidate event of the one or more candidates correspond to the event of interest. Alternatively, a purchase of an item related to the event may be automatically made in response to activating the event stamp.

63 Claims, 9 Drawing Sheets

U.S. PATENT DOCUMENTS

| | | | |
|---|---|---|---|
| 6,834,308 | B1 | 12/2004 | Ikezoye et al. |
| 6,904,264 | B1 | 6/2005 | Frantz |
| 6,925,489 | B1 | 8/2005 | Curtin |
| 7,013,292 | B1 | 3/2006 | Hsu et al. |
| 7,058,710 | B2* | 6/2006 | McCall et al. ............... 709/224 |
| 7,249,123 | B2 | 7/2007 | Elder et al. |
| 7,269,590 | B2 | 9/2007 | Hull et al. |
| 7,363,024 | B2 | 4/2008 | Jenkins |
| 7,809,805 | B2 | 10/2010 | Stremel et al. |
| 7,848,765 | B2 | 12/2010 | Phillips et al. |
| RE42,927 | E | 11/2011 | Want et al. |
| 2001/0003099 | A1 | 6/2001 | Von Kohorn |
| 2001/0018858 | A1 | 9/2001 | Dwek |
| 2001/0025259 | A1 | 9/2001 | Rouchon |
| 2001/0030667 | A1 | 10/2001 | Kelts |
| 2001/0031066 | A1 | 10/2001 | Meyer et al. |
| 2001/0037303 | A1 | 11/2001 | Mizrahi |
| 2001/0037721 | A1 | 11/2001 | Hasegawa et al. |
| 2001/0053944 | A1 | 12/2001 | Marks et al. |
| 2001/0055391 | A1 | 12/2001 | Jacobs |
| 2002/0002039 | A1 | 1/2002 | Qureshey et al. |
| 2002/0002541 | A1 | 1/2002 | Williams |
| 2002/0002899 | A1 | 1/2002 | Gjerdingen et al. |
| 2002/0007354 | A1 | 1/2002 | Deguchi |
| 2002/0010641 | A1 | 1/2002 | Stevens et al. |
| 2002/0010652 | A1 | 1/2002 | Deguchi |
| 2002/0013784 | A1* | 1/2002 | Swanson ............... 707/104.1 |
| 2002/0016748 | A1 | 2/2002 | Emodi et al. |
| 2002/0019858 | A1 | 2/2002 | Kaiser et al. |
| 2002/0023096 | A1 | 2/2002 | Deguchi |
| 2002/0023142 | A1 | 2/2002 | Michaelis et al. |
| 2002/0042754 | A1 | 4/2002 | Del Beccaro et al. |
| 2002/0059201 | A1 | 5/2002 | Work |
| 2002/0107016 | A1 | 8/2002 | Hanley |
| 2002/0145589 | A1 | 10/2002 | Tree |
| 2002/0145943 | A1 | 10/2002 | Tree |
| 2002/0147762 | A1 | 10/2002 | Tree |
| 2003/0028429 | A1 | 2/2003 | Mittman et al. |
| 2003/0034956 | A1 | 2/2003 | Deguchi |
| 2003/0036352 | A1 | 2/2003 | Deguchi |
| 2003/0037035 | A1 | 2/2003 | Deguchi |
| 2003/0101150 | A1* | 5/2003 | Agnihotri et al. ............... 706/45 |
| 2003/0145093 | A1 | 7/2003 | Oren et al. |
| 2003/0153264 | A1 | 8/2003 | Osato et al. |
| 2003/0222918 | A1 | 12/2003 | Coulthard |
| 2003/0225632 | A1 | 12/2003 | Tong et al. |
| 2003/0233282 | A1 | 12/2003 | Ward et al. |
| 2003/0236711 | A1 | 12/2003 | Deguchi |
| 2004/0000995 | A1 | 1/2004 | Deguchi |
| 2004/0024846 | A1 | 2/2004 | Randall et al. |
| 2004/0088177 | A1 | 5/2004 | Travis et al. |
| 2004/0121723 | A1 | 6/2004 | Poltorak |
| 2004/0148275 | A1 | 7/2004 | Achlioptas |
| 2005/0021750 | A1 | 1/2005 | Abrams |
| 2005/0038876 | A1 | 2/2005 | Chaudhuri |
| 2005/0114759 | A1 | 5/2005 | Williams et al. |
| 2005/0136988 | A1 | 6/2005 | Villamil et al. |
| 2005/0144165 | A1* | 6/2005 | Hafizullah et al. ............... 707/6 |
| 2005/0154639 | A1 | 7/2005 | Zetmeir |
| 2005/0159970 | A1 | 7/2005 | Buyukkokten et al. |
| 2005/0171799 | A1 | 8/2005 | Hull et al. |
| 2005/0171955 | A1 | 8/2005 | Hull et al. |
| 2005/0176366 | A1 | 8/2005 | Levy |
| 2005/0177385 | A1 | 8/2005 | Hull et al. |
| 2005/0197846 | A1 | 9/2005 | Pezaris et al. |
| 2005/0198020 | A1 | 9/2005 | Garland et al. |
| 2005/0198031 | A1 | 9/2005 | Pezaris et al. |
| 2005/0198305 | A1 | 9/2005 | Pezaris et al. |
| 2005/0203807 | A1 | 9/2005 | Bezos et al. |
| 2005/0216300 | A1 | 9/2005 | Appelman et al. |
| 2005/0216550 | A1 | 9/2005 | Paseman et al. |
| 2005/0235062 | A1 | 10/2005 | Lunt et al. |
| 2005/0256756 | A1 | 11/2005 | Lam et al. |
| 2005/0279820 | A1 | 12/2005 | Moynihan et al. |
| 2006/0041543 | A1 | 2/2006 | Achlioptas |
| 2006/0042483 | A1 | 3/2006 | Work et al. |
| 2006/0048059 | A1 | 3/2006 | Etkin |
| 2006/0052091 | A1 | 3/2006 | Onyon et al. |
| 2006/0080613 | A1 | 4/2006 | Savant |
| 2006/0085419 | A1 | 4/2006 | Rosen |
| 2006/0136419 | A1 | 6/2006 | Brydon et al. |
| 2006/0143183 | A1 | 6/2006 | Goldberg et al. |
| 2006/0161599 | A1 | 7/2006 | Rosen |
| 2006/0184617 | A1 | 8/2006 | Nicholas et al. |
| 2006/0190281 | A1 | 8/2006 | Kott et al. |
| 2006/0194186 | A1 | 8/2006 | Nanda |
| 2006/0218225 | A1 | 9/2006 | Hee Voon et al. |
| 2006/0229063 | A1 | 10/2006 | Koch |
| 2006/0230061 | A1 | 10/2006 | Sample et al. |
| 2006/0247940 | A1 | 11/2006 | Zhu et al. |
| 2006/0248573 | A1 | 11/2006 | Pannu et al. |
| 2006/0256008 | A1 | 11/2006 | Rosenberg |
| 2006/0265227 | A1 | 11/2006 | Sadamura et al. |
| 2006/0293976 | A1 | 12/2006 | Nam |
| 2007/0030824 | A1 | 2/2007 | Ribaudo et al. |
| 2007/0167174 | A1 | 7/2007 | Halcrow et al. |
| 2007/0174389 | A1 | 7/2007 | Armstrong et al. |
| 2007/0208916 | A1 | 9/2007 | Tomita |
| 2007/0282987 | A1 | 12/2007 | Fischer et al. |
| 2008/0005076 | A1 | 1/2008 | Payne et al. |
| 2008/0010343 | A1 | 1/2008 | Escaffi et al. |
| 2008/0033776 | A1 | 2/2008 | Marchese |
| 2008/0040428 | A1 | 2/2008 | Wei et al. |
| 2008/0070697 | A1 | 3/2008 | Robinson et al. |
| 2008/0076418 | A1 | 3/2008 | Beyer, Jr. |
| 2008/0086458 | A1 | 4/2008 | Robinson et al. |
| 2008/0132243 | A1 | 6/2008 | Spalink et al. |

FOREIGN PATENT DOCUMENTS

| | | |
|---|---|---|
| WO | WO 01/27745 A1 | 4/2001 |
| WO | WO 01/41441 A1 | 6/2001 |
| WO | WO 02/23773 A2 | 3/2002 |
| WO | WO 02/27600 A2 | 4/2002 |
| WO | WO 02/073975 A1 | 9/2002 |
| WO | WO 03/003316 A1 | 1/2003 |
| WO | WO 03/054852 A1 | 7/2003 |

OTHER PUBLICATIONS

Title: Facebook: iPhone Application URL: http://itunes.apple.com/us/app/facebook/id284882215?mt=8 Date: May 5, 2011; 2 pages.

Title: Movies by One Tap: iPhone Application URL: http://itunes.apple.com/us/app/movies-by-onetap-listings/id284249445?mt=8 Date: May 5, 2011; 2 pages.

Title: Movies Now HD: iPhone Application URL: http://itunes.apple.com/us/app/movies-now-hd/id374189261?mt=8 Date: May 5, 2011; 2 pages.

Title: Siri Assistant URL: http://itunes.apple.com/us/app/siri-assistant/id351778157?mt=8 Date: May 5, 2011; 2 pages.

Title: Taxi: iPhone Application URL: http://itunes.apple.com/app/taxi/id288670013?mt=8 Date: May 5, 2011; 2 pages.

Title: Yowza! Mobile Coupons: iPhone Application URL: http://itunes.apple.com/us/app/yowza-mobile-coupons/id312021877?mt=8 Date: May 5, 2011; 2 pages.

Title: Online Internet Radio Station Directory at Internetradiosearch.com URL: http://web.archive.org/web/20030812175006/www.songsearch.net Date: Aug. 12, 2005; 1 page.

Title: Virgin Radio—Search Results; URL:http://web.archive.org/web/20050720025508/www.virginradio.co.uk/thestation/nowplaying/songsearch.html Date: Aug. 8, 2005; 1 page.

Title: On the Radio.Net: Songs URL: www.ontheradio.net/Songs.aspx Date: Aug. 8, 2005; 1 page.

Title: Xfm—The UK's New Music Radio Station; URL: http://www.xfm.co.uk/messageboard/Default.asp? sub=show&action=posts&fid=38&tid=10 Date: Aug. 8, 2005; 1 page.

Title: Xfm—The UK's New Music Radio Station; URL: http://www.xfm.co.uk/messageboard/Default.asp? sub=show&action=posts&fid=38 Date: Aug. 8, 2005; 1 page.

Title: Song Search—Monster Marketplace URL: www.monstermarketplace.com/googlesearch.asp?q=song%20search Date: Aug. 8, 2005; 2 pages.

Title: Melissa Data: AM, FM and TV Stations by Zip Code URL: http://www.melissadata.com/lookups/Fcc.asp?InData=95125&submit1=Submit Date: Aug. 8, 2005; 1 page.

Title: Replay Radio; URL: http://web.archive.org/web/20050724232936/http://www.replay-video.com/replay-radio/index.php Date: Jul. 24, 2005; 1 page.

Title: Rockband.com: Unsigned and Indie Rock Bands; URL: http://web.archive.org/web/20050723081315/http://www.rockband.com Date: Jul. 23, 2005; 1 page.

Title: Song Lyrics Search Engine; URL: http://web.archive.org/web/20050720073905/http://lyricsearch.net/ Date: Jul. 20, 2005; 2 pages.

Title: Run-D.M.C.—Radio Station Lyrics URL:http://web.archive.org/web/20050319114905/http://www.lyricsdepot.com/run-d-m-c/ Date: Jul. 20, 2005; 2 pages.

Title: Music—Song Lyric Search, Reb Music URL: http://web.archive.org/web/20050513072647/http://rebmusic.com/songlyricsearch Date: Jul. 20, 2005; 6 pages.

Title: 102.1 Milwaukee's Alternative Station; URL: http://web.archive.org/web/20050707015215/http://www.milwaukeesalternativestation.com, Date: Jul. 20, 2005; 2 pages.

Title: Virgin Radio—The Station—Listen to us online, URL: http://web.archive.org/web/20050720022055/www.virginradio.co.uk/thestation/listen/ Date: Jul. 20, 2005; 2 pages.

Title: Virgin Radio—The Station Song Search; URL: http://www.virginradio.co.uk/search.html, the version for which a hardcopy has been provided can be found at: http://web.archive.org/web/20050720025508/www.virginradio.co.uk/search.html, Date: Jul. 20, 2005; 1 page.

Title: BBC—Radio 2—Playlist; URL: http://web.archive.org/web/20050717055517/http://www.bbc.co.uk/radio2/r2music/playlist Date: Jul. 18, 2005; 1 page.

Title: MusicVoyager—Explorer's Guide to Music; URL: http://web.archive.org/web/20050520233856/http://www.musicvoyager.com Date: May 20, 2005; 1 page.

Title: Winamp Plug-In HTPC MP3 Player Software—Jukebox for Winamp; URL: http://web.archive.org/web/20050403180214/http://www.mp3wirelessjukebox.com Date: Apr. 3, 2005; 1 page.

* cited by examiner

IDENTIFYING EVENTS

CROSS-REFERENCE TO RELATED APPLICATIONS

This application is a continuation of U.S. patent application Ser. No. 11/490,905, filed Jul. 21, 2006, now U.S. Pat. No. 7,761,400 by John Reimer, entitled, "Identifying Events," which claims priority benefit of U.S. Provisional Patent Application No. 60/701,551, filed Jul. 22, 2005, by John Reimer, entitled, "Identifying Events," and which are both incorporated herein by reference, in their entirety.

FIELD

The invention relates generally to finding information.

BACKGROUND OF THE DISCLOSURE

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

An individual may listen to a radio and hear a song or see something that catches the individual's interest. The individual may at later time search the web to find the song or information about the item seen, and may intend to purchase the song or something related to the item seen, but may not have enough information or forget some of the information needed for finding the song or the item seen.

To address this problem, US Patent Application, Publication Number 2004/0002938, discloses a marker for marking pieces of music and a dedicated timestamp. However, the use of the marker and timestamp are somewhat limited and could be improved.

SUMMARY OF INVENTION

In an embodiment, an event stamp function is provided that records multiple pieces of information, such as the time of day, the date, and the location. In an embodiment, the location is identified via GPS coordinates. In an embodiment, when performing a search in addition to returning the event information that has the closest correspondence to the event stamp information about other events that have some partially corresponding information is also returned.

In an embodiment, activating the event function automatically launches an immediate search for the type of information sought. In an embodiment, the event stamp button includes a cylindrical component that rotates, and rotating the cylindrical component causes a scrolling through the search results found. In an embodiment, the user can configure different modes of operation, such as whether the event function causes just the storage information for later use, launches an immediate search, or immediately causes a purchase of a product. In an embodiment, the event function has different modes (and optionally multiple mode buttons that invoke the different modes) in which in each of these modes different types of information are sought.

In an embodiment, the event stamp information may be used for determining which bus, plane, train, or other mode of transportation passed a certain location. In an embodiment, the activating the event stamp function causes a comparison of a radio waves received to sound received or a comparison sounds or clips from a song or other broadcast received and stored to sounds and/or image stored in a database to identify the broadcast of interest. In an embodiment, the event stamp information may be used for determining the location of a particular vendor and initiating a transaction, such as locating the nearest available taxi and ordering a taxi pickup. In an embodiment, the event stamp information may be used to immediately locate a restaurant or other vendor that is nearby, view the menu, and the restaurant owner may return special offers, possibly dependent upon the user visiting the restaurant within a certain time frame. In an embodiment, the event stamp information may used to immediately locate a barber, hairstylist, dentist, doctor, or other shop that is nearby and schedule an appointment.

In an embodiment, the event stamp information may be used for establishing a journal of times and locations visited. In an embodiment, the event stamp may allow entry of a verbal annotation. In an embodiment, the event stamp may include a picture, and optionally the event stamp function may activate a camera (e.g., on a mobile phone).

Any of the above embodiments may be used alone, or with or without any combination of any of the other embodiments. Additionally the invention is not limited to the embodiments listed above. Other embodiments of the invention may exist that do not include any of the above embodiments and/or that include other features not listed above.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE DRAWINGS

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-7 is a brief description of each element, which may have no more than the name of each of the elements in the one of FIGS. 1-7 that is being discussed. After the brief description of each element, each element is further discussed in numerical order. In general, each of FIGS. 1-9 is discussed in numerical order, and the elements within FIGS. 1-9 are also usually discussed in numerical order to facilitate easily locating the discussion of a particular element. Nonetheless, there is no one location where all of the information of any element of FIGS. 1-9 is necessarily located. Unique information about any particular element or any other aspect of any of FIGS. 1-9 may be found in, or implied by, any part of the specification.

In various places in discussing the drawings a range of letters, such as a-l, a-m, and a-n are used to refer to individual elements of various series of elements that are the same. In each of these series, the ending letters are integer variables that can be any number. Unless indicated otherwise, the number of elements in each of these series is unrelated to the number of elements in others of these series. Specifically, even though one letter (e.g. "l") comes earlier in the alphabet than another letter (e.g., "n"), the order of these letters in the alphabet does not mean that the earlier letter represents a smaller number. The value of the earlier letter is unrelated to the later letter, and may represent a value that is greater than, the same as, or less than the later letter.

Figure 1:
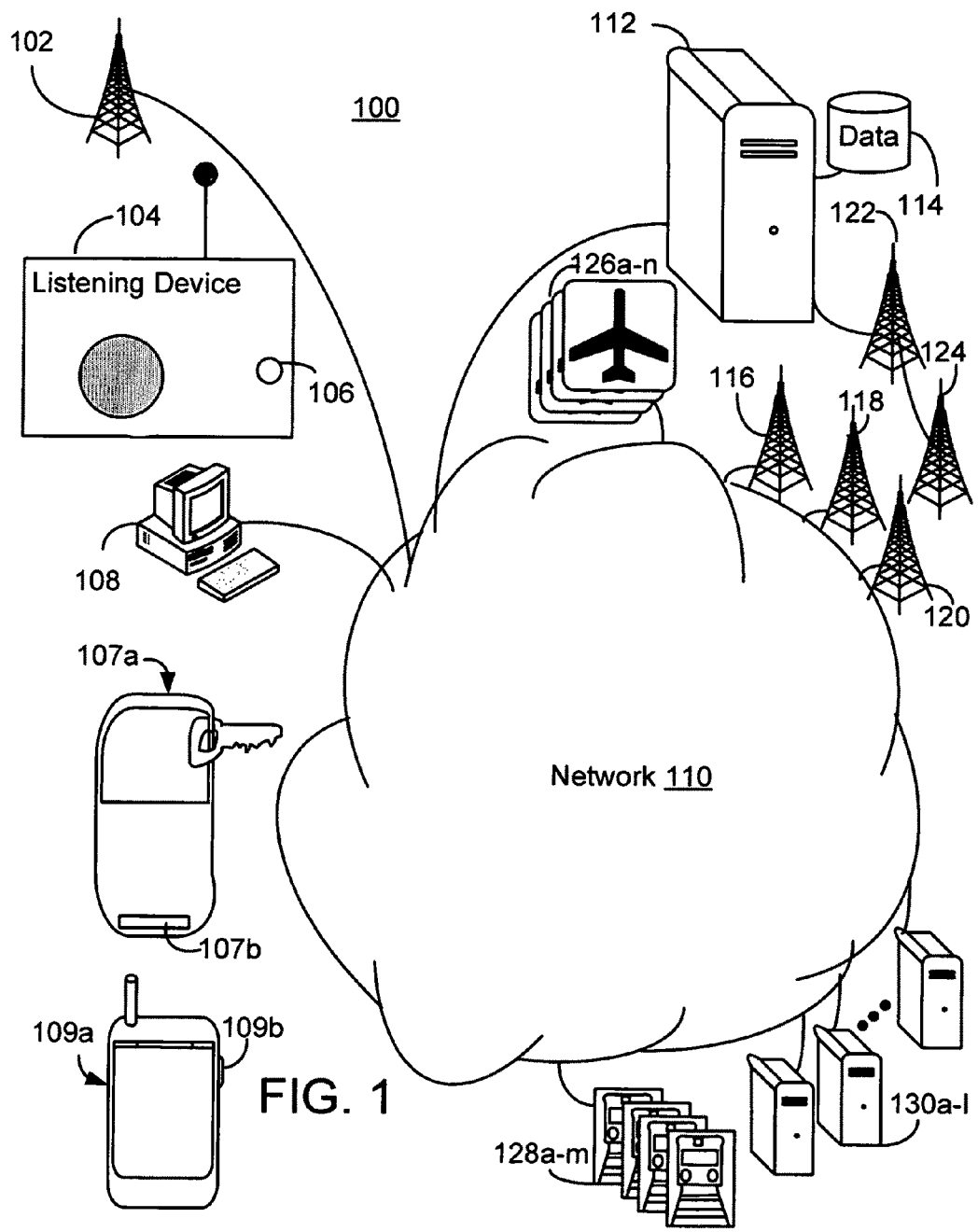
FIG. 1 shows a representation of an example of an event identification system.

FIG. 1 shows an event identification system 100. Event identification system 100 includes broadcast source 102, listening device 104 having event stamp button 106, keychain 107*a* having event stamp button 107*b*, network appliance 108, mobile phone 109*a* optionally having event stamp button 109*b*, network 110, website host 112, database 114, broadcast sources 116-124, airports 126*a-n*, train stations 128*a-m*, and vendor website hosts 130*a*-1. In other embodiments, event identifying system 100 may not have all of the components associated with FIG. 1 or may have other components in addition to or instead of those components associated with FIG. 1.

Event identification system 100 may be used for identifying one or more different types of events. Event identification system 100 identifies at least some identifying information associated with at least certain events, such as a name or other identifier of the event. In this context, event information encompasses a broad range of types of occurrences, such as songs being played on the radio, information about the environment at a particular time, an occurrence of an action, or other forms of events. Similarly, a company that broadcast the sound and/or video segments, a company that shows a movie or play, a company that hosts a sporting event, a company that runs a store (such as a barber shop or restaurant), or company that runs a mode of transportation, such as a taxi, train, bus, airplane, may be referred to as event sponsors. In this specification, any place the word "time" is mentioned, such as in conjunction with an event time associated with an event stamp, it is generic to the time of day, the calendar date, and the combination of the time of day and the calendar date. Consequently, any place the word "time" appears at least three specific embodiments may be obtained by substituting, the time of day, the calendar date, and the combination of the time of day and the calendar date for the word "time." As an example of a type of event that may be identified, in one embodiment, event identification system 100 is capable of identifying songs played on a radio station. In another embodiment, event identification system 100 is additionally, or alternatively, capable of identifying information about other types of events, such as which radio program was played at a particular time, information that was in an advertisement at a particular location, or which airplane or train passed by a particular location at a particular time or used a particular travel way (e.g., a particular train track, road, shipping lane and/or air passageway).

Broadcast source 102 may broadcast a wide variety of types of information, such as sound, text, and/or images. For example, broadcast source 102 may be a radio station that broadcasts sound segments, such as songs and/or radio programs. In another embodiment, broadcast source 102 may be a television station that broadcasts both image and sound information. Broadcast source 102 is discussed further in conjunction with broadcast sources 116-124.

Listening device 104 outputs the information being broadcast. For example, listening device 104 may include a radio. Listening device 104 may be capable of outputting sound or other information from other sources, such as a Compact Disc (CD), flash memory, and/or hard drive. For example, listening device 104 may include a radio, a television, and/or a media player, such as a Moving Pictures Expert Group 3 (MPEG 3—a compression standard—or more commonly referred to as MP3) player with a radio attached, or a cassette player with a radio attached. Optionally, listening device 104 may include a system that determines a current location, such as a Global Positioning System (GPS) or a receiver for receiving GPS coordinates from a GPS system. There are many embodiments of the event identification device. Listening device 104 is just one example of a device that may be used as and/or included in an event identification device. If the event identification device is capable of receiving broadcasts, it may be referred to as a receiving device. Other non-limiting examples are given below.

Event stamp button 106 is button that activates an event stamp function, which is a function that causes the recording of event stamp information, which may be identifying information. An event stamp function is generic to a timestamp but may include other information in addition to and/or instead of the time. For example, the event stamp may record time, location, image information (e.g. photographs, audio and/or video of a location and/or event), and/or a broadcast source being received. Any of the functions discussed in association with any of the event stamp buttons or event stamp functions in this specification may be associated with any event stamp function that may be initiated by any event stamp button. In this specification, the term identifying information refers to information that is used for identifying an event and the term event stamp information refers to information recorded as a result of activating an event stamp function. The event stamp function may be activated by one or two actions, for example. The event stamp information may be event identifying information. Event stamp button 106 is an example of an implementation of an event stamp function that may be included in any event identification device. For example, the event stamp information recorded by event stamp button 106 may include information related to when and where the event occurred and/or the type of event.

Event stamp button 106 may be a mechanical button, a heat sensitive pad, or other touch sensitive pad. Although in one embodiment, the event stamp function may be activated by pressing on a button in other embodiments the event stamp function is activated in any of a variety of other ways. For example, instead of event stamp button 106, the event stamp function may be activated by a switch, an icon on a display, a roller, a function of another button.

In one embodiment, event stamp button 106 is a timestamp that records the time of the event. In an embodiment, event stamp 106 may record a location associated with the pressing of event stamp 106. The location information may be useful for many different types of events in a variety of different ways. In the case of a radio broadcast, event stamp button 106 may record the time of day at which event stamp button 106 was activated, the radio station being played by listening device 104, and optionally may record location information (e.g., GPS coordinates). The location information may be useful in identifying a broadcast source such as a radio station, because the same radio station number may be used by different radio stations having different locations, for example. In other words, situations in which there are multiple radio or television stations having the same name but having different locations, the location information may be useful in differentiating between the two radios or television stations. Event stamp button 106 does not need to be placed on listening device 104.

The event stamp function may be associated with a multiplicity of different functions. Similarly, event identifying system 100 may be used for identifying any of a number of types of information. For example, the event stamp function may be used for creating a journal of locations and times that the locations were visited. The event stamp function may cause a search for a place, a song, a television program, a movie, a play, a form of transportation, and/or an advertisement. The event stamp function may cause a recording of an excerpt of a broadcast (including images and/or sound), sounds and/or images of the location at which the event function is implemented, and/or a voice annotation (e.g., explaining why the event stamp function was implemented and/or other information associated with an event). As another example, a user may be able to manually enter a time and a location along a railroad line, or a search may be automatically launched in response to activating an event stamp function, to find out which train passed by a particular location at a certain time. The user may be able to determine the train's origin and regular schedule. As another example, event identification system 100 may be used to find out information that was in an advertisement, such as on a billboard, in a bus or along a roadside and/or to find out information that was in an advertisement on television or radio.

Instead of, or in addition to, placing event stamp button 106 on listening device 104, an event stamp function may be placed on any mobile device to get information while traveling. The event stamp function may be placed on a viewing device, such as a television, on the dashboard of a car. The event stamp function may be placed elsewhere in a car, in a purse, in a wallet, on a briefcase, on a bicycle, and/or on a keychain (some examples are discussed below). Similarly, event stamp button 106 may be included on a cell phone, a media player, a computer, a web appliance, a MP3 player, a radio, a television, a vehicle, a handheld computer, a keychain or a memorandum device, for example. Each time the user activates the event stamp function, an immediate search launched for a particular type of information. Additionally or alternatively, the time and optionally other information, such as a radio station being played may be recorded in a memory system in a machine readable medium. Optionally or alternatively, the device also collects GPS or other location information that is included in the event stamp to facilitate identifying the station. At a later time or immediately after collecting the event information, the user causes the event stamps to be uploaded to the website or the event stamp is automatically sent to the website in response to activating the event stamp function, and for each event stamp, the website displays corresponding event information, such as songs. Alternatively, the user enters the event stamp information into the website manually. Event information related to events that occurred before and after the time of the event may be returned in addition to events associated with the same time as the event stamp. In an embodiment in which the events are songs being played, for each event stamp, the song played at that time of the event stamp is displayed and one or two songs before and after the song corresponding to the time of the event stamp may also be displayed. Then the user may select a link for purchasing one or more songs desired.

In an embodiment, the time, location, and/or other data could be recorded by hand for use in determining an event. Alternatively, the user may carry a device that has an event stamp function on it. If included on a radio, upon hearing the broadcast segment, the event stamp button is pressed, and the time and radio station are automatically recorded. If the device has GPS capability, the GPS coordinates may be automatically recorded as part of the event stamp. In an embodiment, broadcasts may be sent with profile information, which may appear at the head of a broadcast message or elsewhere. Circuitry associated with the event stamp may be configured for reading the profile information of a broadcast from the circuitry associated with a media player or other device that is designed to read the profile information from the broadcast segment.

The event stamp function may be associated with a continuous recording of events (e.g., a continuous recording of all broadcast segments played on a radio or media player). The event stamp may be just a marking on the recording to identify the segment stamped. Optionally, part of the recording is discarded and part is retained. The part retained includes at least the segment marked and may optionally also include one or more segments preceding the one marked and/or one or more segments following the one marked. The user may hear a segment, and after the segment is finished the user may decide that to purchase the segment. Retaining the one or more segments prior to and/or after the one marked facilitates finding the segment that is desired, even after the segment is no longer being broadcasted.

Specifically, returning several segments associated with times or other information other than the time and event information associated with the event stamp may facilitate finding the event (e.g., the broadcast segment) of interest despite potential inaccuracies in the time information or other information associated with the event. Regarding broadcast sources, even if the time associated with the event stamp is accurate, the broadcast source may not have a schedule of which segment was played at any particular time. Even if the broadcast source initially had a schedule of when the broadcast source planned to broadcast each segment, the broadcast source may deviate from its plans. For example, the broadcast source may play the segments at different times, play the segments in a different order, play segments not planned to be played, or not play all of the segments planned to play. As another example, if the events are taxis that are currently available and nearby, several available taxis may be returned in addition to the closest tax, because the user may prefer to wait a longer time to get a taxi that is less expensive and/or that provides more courteous service.

Thus, after pressing the event function, the user may retrieve the information recorded and use the information to determine the event (e.g., the segment such as a song that was broadcast) by visiting the website and entering at least some of the information recorded. The information recorded may be uploaded to the website or entered by hand. Optionally, the event stamp function may automatically connect to a web address and initiate a purchase of the segment (e.g., by actually purchasing the segment or giving the user an option to purchase the segment). The event function may have different settings that control whether to immediately start a purchasing process or just record the event information without initiating a purchasing procedure. The event stamp function may send a communication, such as an e-mail or other communication, to a purchasing site (e.g., the website) that is answered at a later time. Alternatively, the event stamp function may initiate a direct link to the purchasing site.

As an example of listening device 104, listening device 104 may include at least a tuner having a read out of the station being played, a time source (e.g., a clock), and event stamp button 106. The event stamp function may be associated with a memory for recording the event stamp information. In an embodiment, instead of or in addition to using a time to identify a song, a fingerprint of the song is used. In other words, identifying characteristics of the song are recorded, such as a segment of the song, the tone, and/or the pitch. The identifying characteristics may then be used to identify and/or purchase the desired song. As another example in which time may or may not be included, the identification of a billboard may be performed by using the location to identify the advertisement. In an embodiment, the time is included in the event stamp even when not necessary for identifying the event.

Keychain 107a is another example of an event identification device, and keychain 107a may be for car keys and/or other keys. Event stamp button 107b is similar to event stamp button 106 in that it may be used for recording event identifying information, such as a time, a location, a radio station identifier, and/or other information that may be used for identifying an event. Event stamp button 107b is another example of a location where an event stamp function may be placed. Keychain 107a may include circuitry capable of locating a radio station based on sounds being emitted from a listening device (such as listening device 104) in response to activating event stamp button 107b. For example, keychain 107a may include a receiver for receiving audio signals. Upon pressing even stamp button 107b, the keychain scans radio stations using a tuner in the keychain. The audio signals for a radio external to the keychain are matched to songs found while scanning radio stations. Once a match is found, information identifying the song and/or the radio station playing the song is recorded. This information can be used later or immediately to purchase the song.

Network appliance 108 may be any of a number of types of appliances that are capable of accessing a network, such as a computer, a terminal, a web television, and/or a mobile phone. The user enters event identification information recorded by an event stamp function (e.g., event stamp button 106 or 107b) into network appliance 108, and in response network appliance 108 sends the event identifying information to another location for identifying the event associated with the information recorded by the event stamp function. The information may be entered manually, uploaded, and/or transferred wirelessly into network appliance 108. Network appliance 108 may itself have a hardware and/or software version of an event stamp function, and this embodiment is another example of an event identification device. In addition to, or instead of, the information recorded by event stamp functions 106 or 107b, an event stamp function associated with network appliance 108. In addition to or instead the event stamp functions discussed in conjunction with event stamp buttons 106, 107b, and 109b, the event function of appliance 108 may record the URL link associated with a webcast and optionally other information about the webcast to facilitate identifying the webcast.

Mobile phone 109a is another example of an event identification device, and is an example of a network appliance. Mobile phone 109a may link via a phone network to a computer network to retrieve information associated with an event function stamp. Mobile phone 109a may include an event stamp button 109b. Although event stamp button 109b is depicted as a button, event stamp button 109b may be a menu item that is selected using cursor control buttons, such as the cursor control buttons that are often associated with the keypad of a mobile phone.

Network 110 may be any one of, or any combination of one or more Local Area Networks (LANs), Wide Area Networks (WANs) (e.g., an Internet or intranet), phone networks, wireless networks, and/or other networks. Event identifying information is sent from one of the devices having an event function via network 110 to a database, where more information about the event may be obtained.

Website host 112 hosts a website that may be accessed by one of the network appliances. The event stamp information (which may include event identifying information) is sent from one of the network appliances, via network 110, to website host 112. Website host 112 uses the event stamp information to retrieve other event information, which may include an event identifier (e.g., a name of an event). The other event information may include download information and/or purchase information, which may be used to download and/or purchase a recording or other information about the event. For example, if the event is one or more songs or other segments of a radio program or one or more segments of a television show, the information downloaded may include information about where to download and/or purchase the one or more segments, songs, programs and/or shows. In an embodiment, the website may return several segments that are before and after the one corresponding to the timeslot chosen. The reasons for returning events corresponding to times before and after the time of interest was explained above.

In one embodiment, website host 112 may host a website in which a user enters the time, location, and broadcast source (e.g., radio station or television station) and the website returns the segment (e.g., song title and artist, radio program, or television program) that was being broadcasted at that time, for example. The website may have links to one or more vendors that sell the segments (e.g., songs) that were broadcasted. In one embodiment, the selection of the link causes the segment to be purchased. Alternatively, by selecting the link the user may be brought to web pages associated with the vendor for making the purchase. In another embodiment, any segment may be downloaded for free. In an embodiment, downloading segments for free may be limited to certain conditions, only at certain times, and/or only certain segments. Thus, in embodiments having a website, the user can hear a segment of a broadcast, write down the time, place, and/or other event information (or record the event information using an event function), and then the user can go to the website to obtain the segment. In another embodiment, in response to activating the event function, an identification device (such as listening device 104, key chain 107a, network appliance 108, and/or mobile phone 109a) may automatically initiate a search or make a purchase via website host 112, which then automatically returns the search results and/or a purchase receipt to the identification device.

Database 114 may store information that is used by website host 112 in conjunction with the event stamp information sent from one of the web appliances or other identifying device to identify the event. Additionally, database 114 may store information related to where to obtain and/or purchase commodities related to the event, such as songs, radio programs, airline tickets, train tickets, and/or tickets to shows. For example, database 114 may store information, such as links to websites where a broadcast may be purchased, playlists, programming schedules, and/or contact information for various broadcast sources. Website host 112 may maintain database 114 (in which event information, such as broadcast segments and information about the broadcast segments are stored). Database 114 may maintain a correlation of event information. For example, database 114 may maintain a correlation of the segments actually broadcasted with the times the segments were broadcasted and optionally with the other information such as the broadcaster, the broadcast area of the broadcaster. Database 114 may maintain a correlation of routes, schedules, and bus numbers and/or train identifiers. Database 114 may maintain a correlation of taxi identifiers and current locations of the taxis. Database 114 may maintain a correlation of restaurants, locations, menus, and/or special offers. Database 114 may maintain a correlation of times, locations, temperature, pressure, humidity, and/or whether it was sunny, cloudy, or raining.

To keep database 114 up to date, website host 112 may monitor one or more (possibly a very large number of) broadcast sources (e.g., radio stations) and/or other sponsors. Further, based on the monitoring database 114 may record the date, time of day, event sponsor (e.g., broadcast source), and/or the event occurrence (e.g., the segment being broadcast). In an embodiment, the various broadcast sources may be monitored by human monitors, associated with website host 112 and/or database 114, that enter the data about the broadcast segment into database 114. In an embodiment, the broadcast source (e.g., a radio station) or other event sponsor may send an event schedule (e.g., a playlist, a schedule of entertainment events, or schedule associated with a mode of transportation) to database 114, a record of the times when the events actually occurred (e.g., when the segments were actually broadcasted, the entertainment event actually occurred, or the times when a transportation vehicle actually arrived at locations on its schedule), and/or other information associated with the events. Website host 112 may provide the radio station or other event sponsors with tools for submitting a record to database 114 of when events occurred. Alternatively, the website host 112 may automatically monitor the event sources (e.g., broadcast sources or radio transmissions of dispatchers) and figure out which events occurred and when the events occurred.

In the case of broadcasts, the broadcast coming from the event source may include (e.g., come with) a profile from which event information may be extracted. For example, the profile may include the time of the segment, an identifier of the segment (e.g., the name of the song or program), and the location of the broadcast source of the segment. The event information may be extracted and stored in database 114 in correlation with the event, and/or may be extracted by the event identification device (e.g., listening device 104) of the user.

Broadcast sources 116-124 are a set of broadcast sources, such as radio or television stations. Broadcast sources 102 and 116-124 are one of many examples of types of event sponsors or event sources. Website host 112 collects information from broadcast sources 102 and 116-124 related to the time and content of broadcasts that were delivered, which may be stored in database 114. Thus, when information from an event stamp is received by website host 112, the information gathered from broadcast sources 102 and 116-124 may be used to determine the corresponding broadcast, the broadcast source from which the broadcast originated, and a link to a vendor that sells the broadcast. In some cases the broadcast source may also be the vendor that sells the broadcast. Although only six broadcast sources are depicted, there may be any number of broadcast sources.

Broadcast sources 102 and 116-124 may be communicatively linked to website host 112 in a variety of different ways. For example, broadcast sources 102, 116, 118 and 120 may be linked to website host 112 via network 110. Thus, broadcast sources 102, 116, 118, 120 may be linked to website host 112 via WAN, LAN, and/or just ordinary phone lines, for example. Obtaining information from broadcast sources 102, 116, 118, and 120 may be automated or may involve a person telephoning, or listening to, broadcast sources 102, 116, 118, and 120, and then recording the information. Broadcast source 122 is an example of a broadcast source being directly connected to website host 112, and broadcast source 124 is an example of a broadcast source linked via another broadcast source, to website host 112. In an embodiment, an event source (e.g., one of broadcast sources 102 and 116-124 or other event source) and/or other sponsors of events may receive a monetary compensation each time a user purchases and/or accesses information related to a product based on an event (e.g., a broadcast or other event) that originated from (e.g., was sponsored by or broadcasted by) that event source. The broadcast source, such as one of broadcast sources 102 and 116-124, that hosted the event (e.g., that broadcasted the segment) may be compensated for purchases associated with the event, such as the purchase of the segment, every time a user makes a purchase that is based on information that is expected to have been obtained during the event, such as information indicating hearing the segment at the radio station or seeing an advertisement.

Airplane sources 126*a-n* and train sources 128*a-m* are examples of other sources of information about events and/or event sponsors that may provide information about events to website host 112. Airplane sources 126*a-n* represent one or more airports and/or airlines, and train sources 128*a-m* represent one or more train stations and/or transit services. For example, a user may hear a plane fly overhead, or a train pass by, at a particular time and location. The user then enters the information into one of the devices having an event stamp, such as network appliance 108 or mobile phone 109*a*. The event information is then forwarded to website host 112. Network host 112 then retrieves information from database 114, which was gathered from airplane sources 126*a-n* or train sources 128*a-m*, and then determines the airline and flight information or the train and train schedule, respectively. Network host 112 may also provide one or more links where an airline ticket or a train ticket (e.g., related to the event stamp information) may be purchased.

Vendor website hosts 130*a-l* represent one or more host of websites of vendors that sell songs, movies, radio programs, television programs, tickets to shows, tickets to movies, train tickets, airline tickets, taxis, barbers, restaurants, products associated with an advertisement and/or other products related to event identifying information provided. Website host 112 may send a link such as a URL to a web appliance or cause a web appliance to link to one of vendor website hosts 130*a-l*, in response to receiving a request to purchase items associated with an event form website host 112 and/or form a web appliance. Website host 112 may refer a web appliance to one of vendor website hosts 130*a-l* for buying a product and/or for finding out more information about the product.

Event identification system 100 may be used for identifying other types of events by including other types of organizations that are responsible for generating those events. For example, event identification system 100 may be used for identifying the contents of ads on buses or on bill boards by having website host 112 linked to the advertising agencies that produce the ads on the buses or bill boards, respectively.

Figure 2:
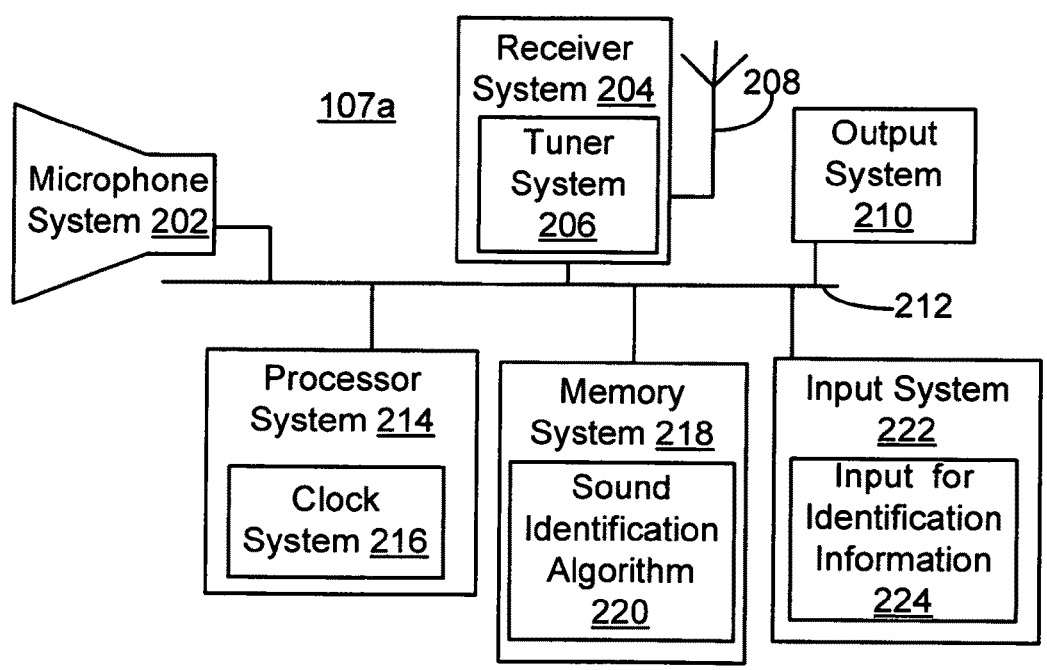
FIG. 2 shows a block diagram of an embodiment of the keychain of FIG. 1.

FIG. 2 shows a block diagram of an embodiment of keychain 107a. Keychain 107a may include microphone system 202 and receiver system 204, which may include tuner system 206. Keychain 107a may also include antenna system 208, output system 210, bus system 212, and processor system 214, which may include clock system 216. Keychain 107a may also include memory system 218, which may store sound identification algorithm 220. Also, keychain 107a may include input system 222, which may include input for identification information 224. In other embodiments, keychain 107a may include or may not include all of the components and/or may include other components, in addition to, and/or instead of the components listed above.

Microphone system 202 may include one or more microphones and may receive sound waves that are used for identifying a broadcast segment. Receiver system 204 may include one or more receivers that may receive radio waves, which may be compared to the broadcast segment in order to identify a television and/or radio station associated with the sound waves being emitted by the television or radio. Receiver system 204 may also be capable of receiving Global Positioning Satellite (GPS) signals for determining a current location.

Tuner system 206 may automatically tune the frequency of the radio waves that is received by receiver system 204 or otherwise change the channel or station being received by receiver system 204. By automatically tuning tuner system 206, a set of several stations and/or channels may be scanned in order to determine whether there is a match between the broadcast segment received by the microphone and the radio waves received by the receiver. In some cases the time that it takes to match the sound waves received with a radio station may be longer than the time of play of the radio broadcast of interest, but nonetheless the radio station may be identified, which in combination with the time may identify the broadcast segment of interest.

Antenna system 208 is attached to receiver system 204 and picks up an electromagnetic signal from the environment, which is sent to receiver system 204. The electromagnetic signal picked up by antenna system 208 is determined by the current settings of tuner system 206. Antenna system 208 may be located within the key fob of the keychain and/or exterior to the key fob. In an embodiment, the keychain attached to the key fob is part of the antenna, and consequently any metal keys attached hanging on the keychain may also act as part of antenna system 208.

Output system 210 is for outputting identifying information associated with the broadcast segment. For example, output system 210 may include a port that can be communicatively coupled to a computer via which the event stamp information may be transferred to a computer so that the broadcast segment may be identified via a website on network 110. The communicative coupling may be accomplished by an electrical and/or optical connection, for example. In addition to, or instead of a port, output system 210 may include a display for displaying the event stamp information so that the event stamp information may be manually input to a web appliance attached to network 110. If output system 210 includes a display, the display may show information input by a user, so that the user can verify that the information that is currently being input is the information that was intended to be input. Depending on the embodiment, the display may be capable of displaying both input information and displaying automatically generated event stamp information. Alternatively, the display may only be capable of displaying one of the input information or the automatically generated event stamp information.

Bus system 212 carries signals between the components of keychain 107a. For example, bus system 212 communicatively couples microphone system 202, receiver system 204, and processor system 214 (processor system 214 is discussed in the next paragraph). In other embodiments the components of keychain 107a communicate in other ways instead of using bus system 212.

Processor system 214 may compare signals generated by microphone system 202 (generated as a result of the microphone receiving sound waves) and signals generated by receiver system 204 (generated as a result of receiver system 204 receiving radio waves) to determine whether the broadcast segment matches the radio waves or matches a broadcast segment stored on database 114. Processor system 214 may also automatically change the settings of tuner system 206 in order to cause receiver system 204 to scan a set of radio and/or television stations. Processor system 214 may also process GPS signals to determine a location.

Clock system 216 may have many uses that facilitate the operations of processor system 214, for example. Additionally, clock system 216 may be used for recording a time associated with the broadcast segment received via microphone system 202. For example, if a user presses on a event stamp button, processor system 214 may read clock system 216 and record the time in association with other identifying information that may be recorded as event stamp information and may be used to identify the broadcast segment. In an alternative embodiment, processor system 214 may be replaced with a specialized circuit that is configured for comparing the broadcast segment with the radio waves received and thereby determine the radio or television station being listened to and/or configured for recording the time associated with a broadcast segment of interest.

Memory system 218 may store the event stamp information. For example, memory system 218 may store a time associated with activating the event stamp function and a radio or television station that processor system 214 identified as matching the broadcast segment. Memory system 218 may also store a location where the timestamp was pressed, which may have been determined by processor system 214 based on GPS signals. Memory system 218 may also store a part of the broadcast segment, which may be used to help identify the broadcast segment at a later time with the aid of a computer and/or a website.

Sound identification algorithm 220 may also be stored in memory system 218. Sound identification algorithm 220 may be the machine instructions implemented by processor system 214 to determine whether the broadcast segment received and stored in memory system 218 matches radio waves received or a broadcast segment in database 214.

Input system 222 may include a button that activates the event stamp function and causes event stamp information to be recorded in memory system 218 and/or may cause other identification information to be collected and/or stored as part of the event stamp information. Input for identification information 224 may include a keypad or other input mechanism via which identification information can be entered manually via the user, which may be used as event stamp information.

Figure 3:
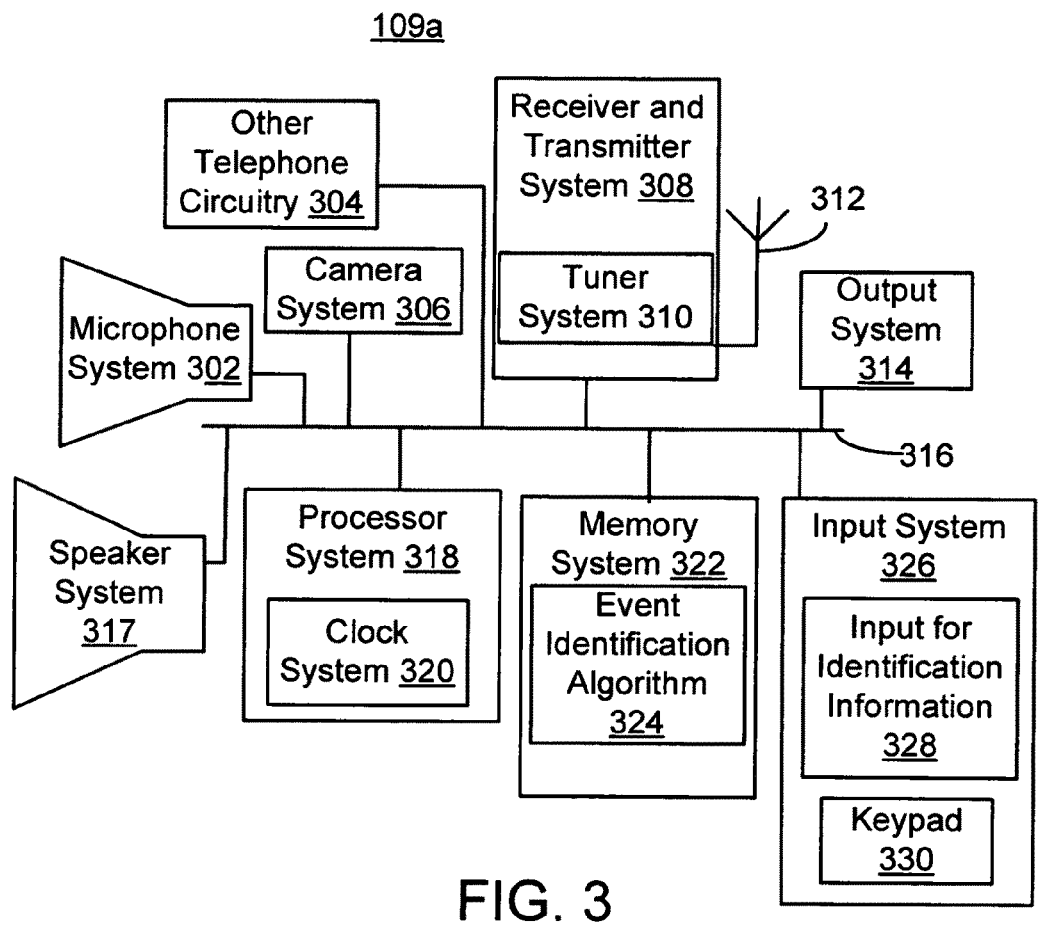
FIG. 3 shows a block diagram of an embodiment of the mobile phone of FIG. 1.

FIG. 3 shows a block diagram of an embodiment of mobile phone 109a. Mobile 109a may include microphone system 302, other telephone circuitry 304, camera system 306, and receiver and transmitter system 308, which may include tuner system 310. Mobile phone 109a may also include antenna system 312, output system 314, bus system 316, speaker system 317, and processor system 318, which may include clock system 320. Mobile phone 109a may also include memory system 322, which may store event identification algorithm 324. Also, mobile phone 109a may include input system 326, which may include input for identification information 328 and keypad 330. In other embodiments, mobile phone 109a may not include all of the components and/or may include other components, in addition to, and/or instead of the components listed above.

Microphone system 302 is for the user to speak into when making a telephone call. Other telephone circuitry 304 is the circuitry that allows mobile phone 109a to function as a telephone, which may include functions for dialing, connecting to a telephone network, storing messages, storing phone numbers, and voice mail, for example.

Camera system 306 is for taking pictures and is optional. The user may choose to take any picture desired upload the picture and send the picture to a friend, for example. Camera system 306 may also take a picture in response to activating the event stamp button 109a. The picture taken by camera system 306 in response to operating may be stored in association with the time and other identifying information.

Receiver and transmitter system 308 receives and transmits messages from and to, respectively, a wireless network. Receiver and transmitter system 308 may receive and transmit phone messages. Optionally, receiver and transmitter system 308 may also receive radio waves. Receiver and transmitter system 308 may also be capable of receiving GPS signals for determining a current location. Receiver and transmitter system 308 may be used for communicatively coupling to a web server, such as website host 112, that stores information, such as playlists of radio stations (that may be used for determining a song, program, or other broadcast segment), menus of restaurants, price lists, taxi locations, or other event information based on event stamp information stored in order to identify the broadcast segment or other event.

Tuner system 310 is optional, and (if present) may tune the frequency of the radio waves that is received by receiver and transmitter system 308 to allow the user to choose which radio station to listen to. Antenna system 312 is attached to receiver and transmitter system 308 and picks up an electromagnetic signal from the environment, which is sent to receiver system 204. The electromagnetic signal picked up by antenna system 312 is determined by the current settings of tuner 312.

Output system 314 is for outputting menu information, search results (which may have been produced as a result of activating an event function), viewing phone numbers being dialed, viewing phone numbers stored, viewing television programs, and optionally viewing information related to a radio station being listened to, for example. Output system 314 may be used for surfing a WAN, such as the Internet, sending and viewing text messages, and viewing web pages. For example, output system 314 may be used for viewing candidates for a broadcast segment or other event information that corresponds to event stamp information stored. Output system 314 may also be used to view the event stamp information being stored. Output system 314 may include a port that can be communicatively coupled to a computer via which the identification information may be transferred to a computer so that the event information may be identified via a website on network 110.

Bus system 316 carries signals between all of the components of mobile 109a. For example, bus system 316 communicatively couples microphone system 302, other telephone circuitry 304, camera system 306, receiver and transmitter system 308, output system 314, and processor system 318 (processor system 318 is discussed in the next paragraph). Speaker system 317 may be used for listening to phone calls, radio stations, television programs, and/or web pages, for example.

Processor system 318 may be configured for automatically or manually locating a website and sending event stamp information to a server for determining an identity of a broadcast segment associated with event stamp information stored on mobile phone 109a in response to pressing event stamp button 109b. Processor system 214 may also be configured for automatically making a purchase base on event stamp information (for example, based on information identifying the broadcast segment). Processor system 318 may also process GPS signals to determine a location. Processor 318 may be configured for reading profile information in a broadcast segment.

Clock system 320 may facilitate the operations of processor system 318. Clock system 320 may also be used for determining a time associated with an event stamp. For example, if a user presses on an event stamp button, processor system 316 may read clock system 320 and record the time in association with other identifying information that may be used included in the event stamp information. In an alternative embodiment, processor system 318 may be replaced with a specialized circuit that is configured for recording event stamps, locating a website, sending the event stamp information to the appropriate host, receiving search results that are based on the event stamp information sent, initiating a purchase based on the event stamp information, and/or completing the purchase initialized.

Memory system 322 may store the identification information. For example, memory system 322 may store a time associated with pressing an event stamp button and a radio or television station that processor system 318 determined as being associated with a broadcast segment that was being played at the time the event stamp was pressed. Memory system 322 may also store a picture taken by camera system 306, which may have been taken in conjunction with pressing the event stamp button. Similarly, memory system 322 may store a location where the timestamp was pressed, which may have been determined by processor system 318 based on GPS signals. Memory system 322 may also store a part of the broadcast segment, which may be used to help identify the broadcast segment at a later time with the aid of a computer and/or a website. As explained above, storing a portion of a broadcast segment may facilitate automatically identifying the correct broadcast segment so that a purchase may also be automatically made without the user reviewing the item being purchased, because the likelihood of purchasing the wrong item is reasonably low.

Event identification algorithm 324 may also be stored in memory system 322. Event identification algorithm 324 may be the machine instructions implemented by processor system 318 that determines the station to which tuner system 310 is tuned. Event identification algorithm 324 may include instructions that cause processor system 318 to take measurements of the frequency to which tuner 310 is tuned. Event identification algorithm 324 may contain instructions that cause processor system 318 to automatically (and/or manually) access a remote database, send event stamp information to the database, and in response receive such results, such as information from the database further identifying the event. For example the further information may be a name of a song, a name of a radio program, a name of a television program, a name of a movie, the number of a bus or train and a name of the company operating the bus or the train, a connection to a taxi dispatcher, the name of a product and an advertiser that makes the product such as the name of a restaurant, club, or hotel.

Input system 326 may include any of a variety of input mechanisms, such as keys, buttons, touch pads, ports for optically or electronically downloading information from other machines (e.g., computers or other mobile phones). In an embodiment, input for identification information 328 may include one or more buttons that initiate an event stamp function, which may include the collection of event identifying information. For example, input for identification information 328 may include a button that may cause processor system 318 to read and record the time from clock system 320. Additionally, the button may cause a picture to be taken and stored in association with the time. Alternatively, the button may cause processor 318 to collect GPS or other location information, which is then stored in association with the time. The button may also cause processor 318 to access a database containing more information related to the identifying information stored. Input identifying information 328 may include two buttons—one button may be for collecting and recording the event identifying information, and the other button may be for accessing one or more remote databases that are expected to contain more information related to event identifying information. Additionally, or alternatively, input for identifying information 328 may include a button for causing identifying information collected to be displayed via output system 314.

In an embodiment, input for identifying information 328 may include one or more mode buttons, which change the mode of an event stamp button. In one mode, the event stamp button may collect information related to a radio or television program being received, which is recorded as the event identifying information. In another mode, the event identifying information collected and recorded may be related to available transportation, such as commuter buses, trains, and planes. In yet another mode, the information collected and recorded may be related to forms of entertainment that are in a particular area, such as restaurants, clubs, gyms, theaters, parks, and museums. In still another mode, information related to advertisements, such as advertisements on public bill boards or in public commuter facilities (e.g., trains, train stations, buses, bus stations, airports, and airplanes) and/or local shops, such as barbers, bookstores, grocery stores, clothing stores, and/or shoe stores may be collected and recorded. Some modes may collect and record the same information, but differ as to which database or which portion of a database is accessed when retrieving further information about the event. For example, a mode for collecting information related to advertisements and a mode for collecting information related to modes of transportation may both record the time, GPS information, and a picture, but the transportation mode may access a database of transportation schedules (e.g., bus, train, and/or plain schedules), while the advertisement mode may access a database storing names of advertisers, products advertised, and the locations where the advertisements are displayed. In a mode for transportation, current locations of available taxis may be included along with an option for automatically ordering a taxi to come and/or for automatically dialing a phone number to contact the taxi or the taxi dispatcher. In a mode for seeing information about places for entertainment, an advertisement may be generated in real time that give special offers if the user uses the service within a particular time frame. For example, if the user is standing outside of the door of a restaurant, and the user activates the event stamp function, in addition to receiving information ordinarily provided by the restaurant, the user may receive a discount if the use orders within a give period of time. In a mode for searching advertisements and local shops the user may be able to automatically reserve a time for a haircut.

The modes may be configurable. For example, event identification algorithm 324 may include instructions that allow the user to configure a transportation mode to only collect information about trains. Event identification algorithm 324 may contain instructions that allow the user to establish a new mode.

Keypad 330 may be a standard keypad provided with a standard mobile phone. Alternatively, one or more of the keys of keypad 330 may act as one or more event buttons and/or as one or more mode buttons for the one or more event buttons. Keypad 330 may include keys and/or modes that allow the user to view event identifying information that was recorded, retrieve information from one or more databases related to the event stamp information initially recorded, and/or to purchase products based on the information retrieved from one or more databases. Additionally, or alternatively, keypad 330 may allow the user to configure one or more mode buttons of input for identification information 328.

Figure 4:
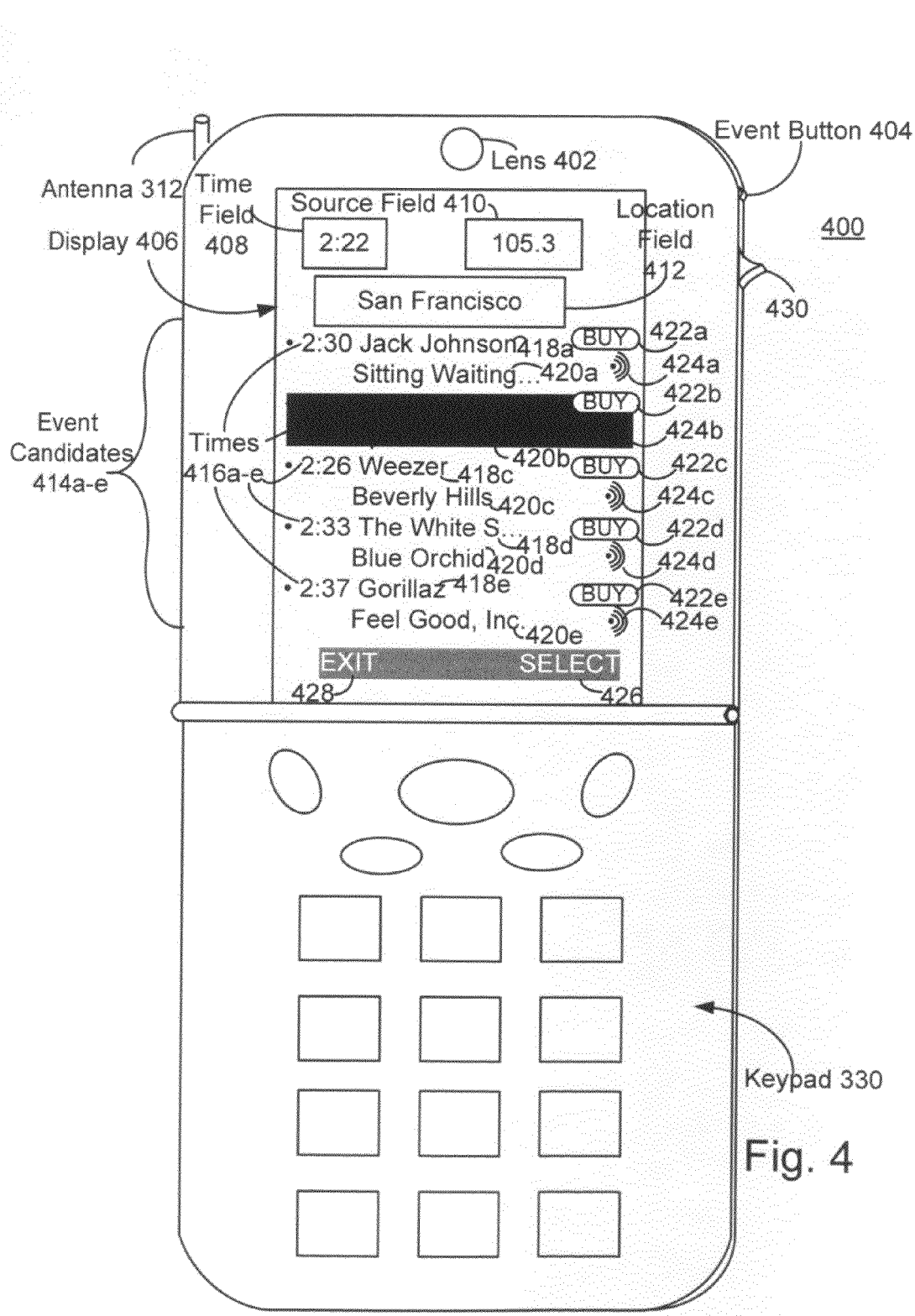
FIG. 4 shows a representation of an embodiment of the mobile phone of FIG. 1, which may be the same embodiment as in FIG. 3 or another embodiment.

FIG. 4 shows an embodiment 400 of mobile phone 109a, which may be the same embodiment as in FIG. 3 or another embodiment. Mobile phone 400 may include antenna system 312, keypad 330, lens 402, event button 404, display 406, time field 408, source field 410, location field 412, candidates 414a-e, which may include times 416a-e, event names 418a-e, event sponsors 420a-e, links 422a-e, and sampler links 424a-e. Mobile phone 400 may also include exit 426, select 428, and switch 430. In other embodiments, mobile phone 400 may include may not include all of the components and/or may include other components, in addition to, and/or instead of the components listed above.

Antenna system 312 and keypad 330 were described in conjunction with FIG. 3, above. However, antenna system 312 and keypad 330 may be used with different circuits than the one of FIG. 3. Lens 402 may be a lens for (forming an image to be recorded) or a view finder for a camera, such as camera system 306 (FIG. 3).

Event button 404 may be part of input for identification information 328 (FIG. 3). Although only one event button is illustrated in FIG. 4, mobile phone 400 may have multiple event buttons and/or mode buttons associated with event button 404, as discussed in conjunction with input for identification information 328. In the example of FIG. 4, event button 404 is illustrated as having a cylindrical component protruding from the housing of mobile phone 400. In an embodiment, the cylindrical component of event button 404 rotates. By pressing event button 404 inwards, the collection of event stamp information may be initiated. In this embodiment, rotating event button 404 may cause scrolling through information displayed in association with event button 404. For example, after associating the event stamp information collected with other event information in a remote database and after retrieving the information (e.g., search results) from the remote database, the information retrieved may be displayed on a display of mobile phone 400 and scrolled through by rotating the cylindrical component of event button 404. Similarly, event button 404 may be used for scrolling through event identifying information collected prior to retrieving information from any database. In other embodiment, event button 404 may have other features that facilitate navigation through information associated with events. In other embodiments, event button 404 may be another sort of switch or button, and scrolling and/or other navigation functions may be implemented by pressing navigation buttons on keypad 330 instead of, or in addition to, event button 404 having navigation features.

Display 406 is the display of mobile phone 400, which may be part of output system 314 (FIG. 3). In FIG. 4, mobile phone 400 is in a mode in which display 406 displays information (about an event) that was retrieved from a remote database. However, mobile phone 400 may have many other modes for displaying many other types of information, such as the information discussed in conjunction with output system 314.

Time field 408 displays a time that was recorded as a result of activating event button 404. In an embodiment, first the user presses event button 404, and event stamp information (e.g., one or more event identifying pieces of information) are collected and stored. Then, immediately or at a later time, a search is automatically launched or the user manually retrieves the event stamp information, and causes the event stamp information to be matched with more information in a remote database, which is returned to mobile phone 400. The information returned may be displayed on display 406. Time field 408 displays the time that the event stamp information was collected as a result of pressing event button 404. In other modes and/or in other embodiments, the time in time field 408 may be entered manually in addition to, or instead of, by selecting an entry stored in the memory of mobile phone 400 (which was stored as a result of pressing event button 402) as an event stamp.

Similarly, source field 410 shows the source of the event associated with the time in time field 408. In the example illustrated in FIG. 4, the event is the playing of a song, and source of the event is the radio station indicated in source field 410. However, in other embodiments and/or in other modes the source of the event displayed in source field 410 may be any of a variety of sources of events such as television stations, current locations of taxis, menu information for restaurants, a bus having an advertisement, an airport where a plane landed, or a train station where a train arrived. In some modes, the source of the event may be assumed to be unknown, and another type of information may be displayed in source field 410 or source field 410 may be left blank or not present on display 406.

Location field 412 may be a location where the event was observed, which was collected as a result of activating event button 404. In the example of FIG. 4, location field 412 illustrates the location where the song was heard. However, in other embodiments and/or modes the location may be a location where an advertisement, a plane, a train, a bus was seen, for example. Although in the example of FIG. 4, the location is a city, which is stationary and of a certain general size, in other embodiments and/or modes the location may be of a smaller or larger size and/or may be mobile. For example, the location may be designated by GPS coordinates, a longitude and latitude, a street, a county, a state, a country, a particular bus, a particular train, and/or a particular plane. In an embodiment, time field 408, source field 410, and/or location field 412 are filled in automatically in response to pushing event button 109*b*.

Event candidates 414*a-e* are candidates for the event of interest to the user. In an embodiment, the event candidate that is expected to be the one of interest to the user is at least initially displayed as highlighted (e.g., selected). In an embodiment, other candidates that occurred before or after the time associated with the event stamp are also displayed so that the user can decide which event (if any) is the one of interest. Although in the example of FIG. 4, five event candidates are displayed in other embodiments and/or other modes more candidates or fewer candidates may be displayed. In an embodiment, the user can configure mobile phone 400 to display the number of candidates desired and/or can select criterion for deciding which candidates are most likely to be of interest.

Times 416*a-e* are the times at which each of candidate events 414*a-e* occurred. Names 418*a-e* are names of candidate events 414*a-e*, respectively, which in the example of FIG. 4 are names of songs. Sponsors 420*a-e* are the names of creators or producers or of candidate events 414*a-e*.

Links 422*a-e* are links where each of event candidates 414*a-e* or items related to each of event candidates 414*a-e* can be found, purchased, and/or downloaded. In the example of FIG. 4, links 422*a-e* may link the user to a webpage where the user can buy and download the song. In other embodiments and/or modes, the user may be brought to a site where the user can download the song for free, purchase tickets for a theater, make reservations for a restaurant, call a dispatcher of a nearby cab, and/or purchase tickets for a train, plane, and/or bus.

Sampler links 424*a-e* may allow the user to see and/or hear at least a portion of event candidates 414*a-e*, respectively. Thus in the example of a song the user can hear the song to determine if the event candidate is the song they want to purchase. In the example of a television program or movie, sampler links 424*a-e* may allow the user to see some of the movie or television program. In the case of a restaurant, sampler links 424*a-e* may allow the user to see the menu or a picture of the restaurant. In the case of a form of transportation, sampler links 424*a-e* may allow the user the see the fair, the schedule, and/or route that the particular public transportation vehicle follows.

Select 426 is for selecting one of links 422*a-e* or sampler links 424*a-e*. Exit 428 exits the mode for viewing candidates 414*a-e*, allowing the user to select other functions of mobile phone 400. Switch 430 is for turning mobile phone 400 on and/or off.

Figure 5:
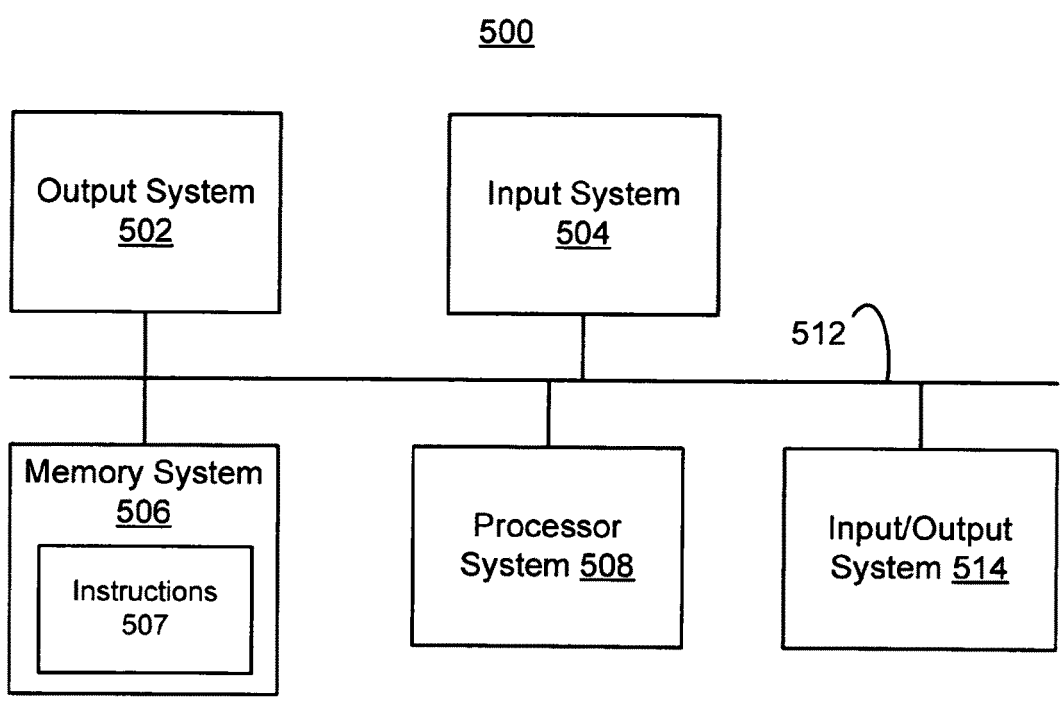
FIG. 5 shows a block diagram of an example of a machine that may be used in the event identification system of FIG. 1.

FIG. 5 shows a block diagram of a machine 500 used in event identification system 100. Machine 500 may include output system 502, input system 504, memory system 506, instructions 507, processor system 508, communications system 512, and input/output system 514. In other embodiments, machine 500 may include may not include all of the components and/or may include other components, in addition to, and/or instead of the components listed above.

Machine 500 is an example of a computer or other machine that may be used for any of network appliance 108, website host 112, database 114, and vendor website hosts 130*a-l* may have the structure of machine 500.

Output system 502 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 504 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 506 may include, for example, any one of, some of, any combination of, or all of a long term storage system, such as a hard drive; a short term storage system, such as random access memory; a removable storage system, such as a floppy drive or a removable drive; and/or flash memory.

Memory system 506 may include one or more machine-readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. The term machine-readable medium also includes mediums that carry information while the information that is in transit from one location to another, such as copper wire and/or optical fiber.

Instructions 507 allow machine 500 to perform the tasks for which it was configured. If system 500 is used for network appliance 108, instruction 505 may include an event identification algorithm similar to that of keychain 107a and/or mobile phone 109a. If machine 500 is website host 112, instructions 507 may cause one or more processors to present a webpage presenting event candidates. If machine 500 is website host 112, instructions 507 may allow machine 500 to receive event identifying information from a network appliance, and to send representations of event candidates to website host 112. If machine 500 is website host 112, instructions 507 may forward the user to a website for purchasing items related to one of the event candidates. Instructions 507 may cause website host 112 to submit a query to database 114 and retrieve information from database 114. If machine 500 is any of network appliance 108, website host 112, database 114, and vendor website hosts 130a-l, instructions 507 may also include an algorithm for matching images and/or sound segments.

If machine 500 is used for database 114 or website host 112, instructions 507 may include a database server, which in turn may include instructions for finding and retrieving information from database 114. If machine 500 is used for database 114, memory system 506 may store information and/or representations of events, such as playlists, transportation schedules, television schedules, current movie showings, play bills, restaurant menus, and/or other information. If machine 500 is any of vendor website hosts 130a-l, instructions 507 may allow the vendor website host to receive a request to present a webpage for purchasing various products, such as songs, movies, tickets, and/or other products.

Processor system 508 may include any one of, some of, any combination of, or all of multiple parallel processors, a single processor, a system of processors having one or more central processors and/or one or more specialized processors dedicated to specific tasks. Processor 508 may implement instructions 507 and/or cause an event function to be performed in response to pressing an event stamp button or otherwise activating an event stamp function.

Communications system 512 communicatively links output system 502, input system 504, memory system 506, processor system 508, and/or input/output system 514 to each other. Communications system 512 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 514 may include devices that have the dual function as input and output devices. For example, input/output system 514 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 514 is optional, and may be used in addition to or in place of output system 502 and/or input system 504. If machine 500 is network appliance 108, input/output system 514 may include an event stamp button or other mechanism for activating an event stamp function.

Figure 6:
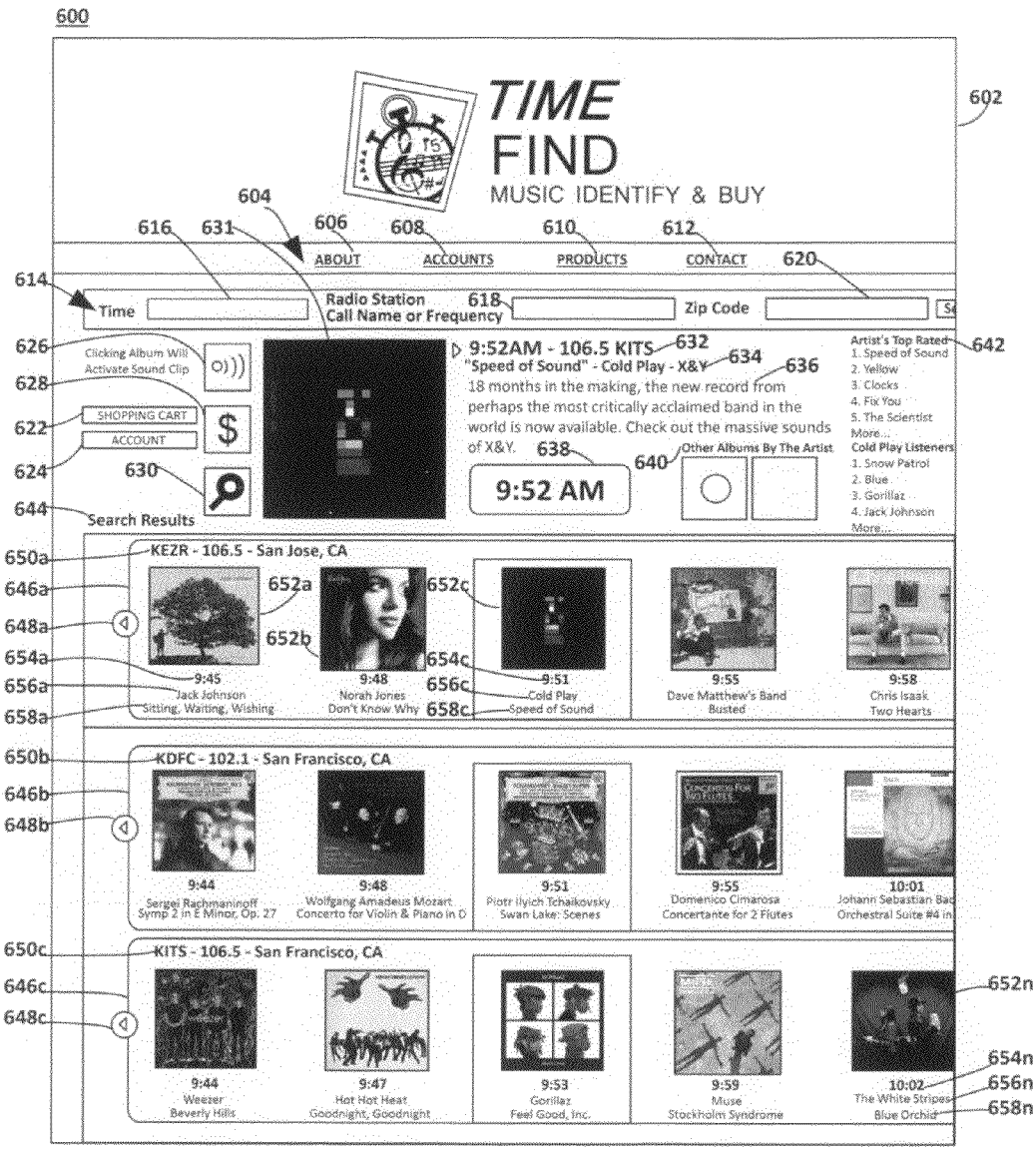
FIG. 6 shows an example of a screenshot of a webpage that may be presented by a website host.

FIG. 6 shows an example of a screenshot of a webpage 600 that may be presented by website host 112. Webpage 600 may include header 602 and navigation links 604, which may include about link 606, accounts link 608, products link 610, and contact link 612. Webpage 600 may also include search field bar 614, which may include time field 616, source field 618, and location field 620. Webpage 600 may include shopping cart link 622, account link 624, sampler link 626, price link 628, details link 630, selected candidate image 631, selected candidate source 632, selected candidate sponsor 634, selected candidate information 636, selected candidate time 638, same sponsor products 640, other related products 642, search results 644, event candidate sources 646a-c, navigation icons 648a-c, source identifiers 650a-c, event candidate images 652a-n, event candidate times 654a-n, event candidate sponsors 656a-n, and event candidate names 658a-n. In other embodiments, webpage 600 may not include all of the features listed above and/or may include additional features instead of, or in addition to, those listed above.

FIG. 6 displays an example of a webpage in which the events are broadcasts of songs. The respective titles and artists of the songs that correspond to event stamps for songs. FIG. 6 has three rows of icons at the bottom, and each row includes 5 icons. Each row corresponds to a single event stamp. In each row, the icon that has been grayed, indicates the song played precisely at the timeslot corresponding to a time associated with the event stamp. The user may select one of the icons corresponding to songs played before and after the grayed icon instead of selecting the grayed icon.

Specifically, header 602 may provide information identifying the purpose and/or owners of the website. Although not illustrated, the webpage shown in display 406 of FIG. 4 may have a similar header. However, webpage 600 has more room for a header, and consequently, header 602 may provide more information than a header for the Short Message Service (SMS) webpage of FIG. 4 or the header may be absent. In an embodiment, mobile phone 107a views a SMS version of webpage 600. Navigation links 604 are links to other web pages associated with the same website as webpage 600. About link 606 is a link to one or more webpages describing various aspects of the organization that sponsors and/or maintains the webpage 600. Accounts link 608 is a link to one or more webpages that assist an individual in setting up an account. Products link 610 links the user to one or more webpages that describe other products provided by the same organization that sponsors and/or maintains webpage 600. Contact link 612 links the user to one or more webpages that give information related to contacting the organization that sponsors and/or maintains webpage 600. In other embodiments, navigation links 605 may not include all of the links of the example of FIG. 4 or may include other links in addition to, or instead of, the navigation links of FIG. 4.

Search field bar 614 includes one or more different fields via which the user may search for the event of interest. Time field 616, source field 618, and location field 620 are essentially the same as time field 408, source field 410, and location field 412, respectively, which were described above in conjunction with FIG. 4. Although in the example of FIG. 4 location field 410 has a city name identifying the location and in the example of FIG. 6 the zip code is used for identifying the location in other embodiments location field 620 may use a city name or other location identifier and/or mobile phone 107a may use a zip code or other location identifier to identify the location associated with the event. In an embodiment, time field 616, source field 618, and location field 620 are filled in automatically. If the user of the webpage 600 or mobile phone 107a is accessing webpage 600 via a device without an event stamp or with an event stamp, but without a means of automatically transmitting the information to website host 112, the user is likely to enter the information manually.

Shopping cart link 622 links a user to one or more webpages where the user may view the items the user selected for purchasing, but has not yet purchased and/or the prices associated with the items selected for purchase. Account link 624 link the user to one or more webpages where the user can view information about their account. In an embodiment, accounts link 608 and account link 624 access the same information. In an embodiment, only one of account links 602 and account link 624 appear on webpage 600.

Sampler link 626 is the same as sampler links 424a-e, which are described in conjunction with FIG. 4, above. Although in the example of FIG. 4 each of event candidates 414a-e has a sampler link, while in the example of FIG. 6 only the selected candidate has a sampler link, in other embodiments and/or modes mobile phone 107a may only offer a sampler link for the selected candidate and webpage 600 may offer a sampler link for each event candidate. In other embodiments, sampler links do not appear for all event candidates displayed, but still appear for other event candidates in addition to the selected event candidate. For example, in another embodiment, in mobile phone 107a and/or on webpage 600, a sampler links only appear of the three event candidates that are expected to have the highest likelihood of being the event candidate of interest.

Price link 628 may link the user to one or more webpages that show the price of the selected candidate. For example, price link 628 may link the user to a list of vendors or to links to vendors that sell items related to the event, and the prices that each vendor charges. Alternatively, selecting or moving a cursor over and/or near price link 628 may cause a balloon to appear displaying the price. In another embodiment, the price may be displayed instead of price link 628 and/or other price links may be displayed elsewhere.

Details link 630 may allow a user to view more details and/or see a larger version of an image displayed for the purposes of representing the selected candidate. Selected candidate image 631 may an image of an item associated with the selected candidate. For example, if the selected candidate is a song, candidate image 631 may be the image on a cover of an album and/or CD where the song can be found. Selected candidate source 632 is the source of the selected event candidate. Sources were described in conjunction with sources 418a-e of FIG. 4. Selected candidate sponsor 634 is the sponsor of the selected event sponsor. Event sponsor were described in conjunction with sponsor 420a-e of FIG. 4. Selected candidate information 636 gives more information related to the selected event candidate. Selected candidate time 638 is the time associated with the selected event candidate. The times associated with event candidates was described in conjunction with times 416a-e of FIG. 4.

Same sponsor products 640 is a list of products (e.g., events or other products) having the same sponsor (e.g., that were made by the same artist and/or that are sold by the same company). Other related products 642 is a list of other products related to the selected event. Search results 644 lists the results of one or more searches for events corresponding to one or more event stamps.

Event candidate sources 646a-c are the event sources that correspond to the information associated with each event stamp entered as a search query. Navigation icons 648a-c allow the user to navigate (e.g., scroll through) the candidate events associated with a particular event source. Source identifiers 650a-c identify the event sources. In the example of FIG. 6 in which the event sources are radio stations, the source identifiers 650a-c are the location, name, and/or frequency associated with each radio station. Event candidate images 652a-n are images (e.g. icons image of covers of CDs having the candidate song) associated with each of the event candidates, respectively. Event candidate times 654a-n, event candidate sponsors 656a-n, and event candidate names 658a-n are essentially the same as times 416a-e, sponsors 420a-e, and names 418a-e, respectively, which were described in conjunction with FIG. 4.

Figure 7:
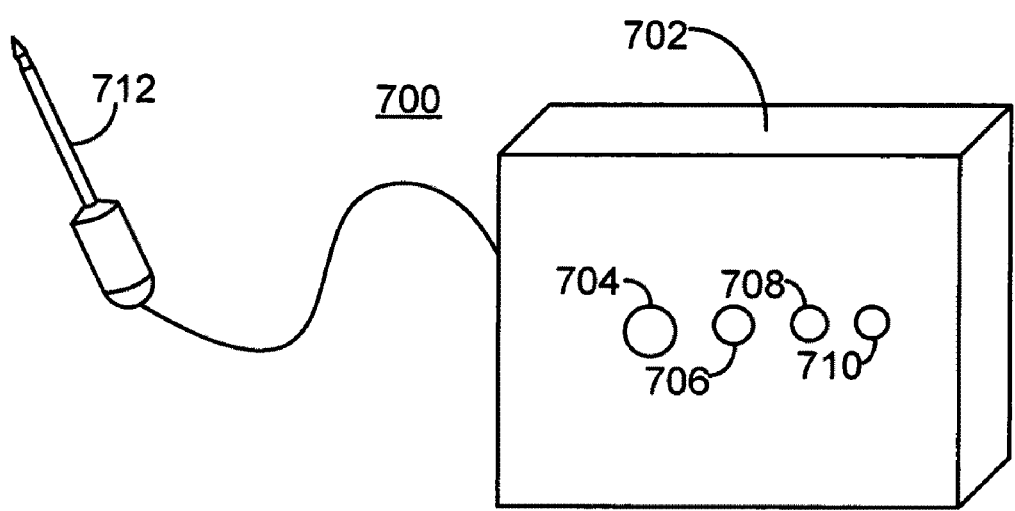
FIG. 7 shows a block diagram of an example of an attachment that may be attached to another device to thereby add an event button.

FIG. 7 shows an attachment 700 that may be attached to another device to thereby add an event button. Attachment 700 includes housing 702, event stamp button 704, first mode button 706, second mode button 708, third mode button 710, and connector 712. In other embodiments, attachment 700 may not include all of the components listed above and/or may include other components instead of, or in addition to, those listed above.

Attachment 700 may include a circuit similar to machine 500 housed within housing 702. Event stamp button 704 may have the same functions as event button 404 of FIG. 4. The machine to which attachment 700 is attached will be referred to as the primary appliance. Pressing event stamp button 704 may cause the device to which attachment 700 is attached (the primary appliance) to collect event stamp information. In another embodiment, pressing event stamp button 704 may cause attachment 700 to collect event information. For example, attachment 700 may include a clock whose time is read and recorded as a result of pressing event stamp button 704. Similarly, pressing event stamp button 704 may cause attachment 700 to determine a radio station to which the primary device is tuned. First mode button 706, second mode button 708, and third mode button 710 may change the mode of event stamp button 704. For example, first mode button 706 may place event stamp button 704 in a mode in which event information related to broadcasts is collected, second mode button 708 may place event stamp button 704 in a mode in which event information related to transportation is collected, and third mode button 710 may place event stamp button 704 in a mode in which event information related to entertainment (e.g., restaurants and theaters) is collected. There may be a third mode button for collecting information related to advertisements. Connector 712 connects to the primary appliance, such as a cell phone, computer, or other primary appliance. Connector 712 is not limited to the specific type of connector illustrated. Any of a number of connectors may be used instead, such as a USB connector or other connector. In one embodiment, attachment 700 stores the event information in the memory of attachment 700. In another embodiment, attachment 700 stores the event information collected in the memory of the primary appliance to which it is attached.

Figure 8:
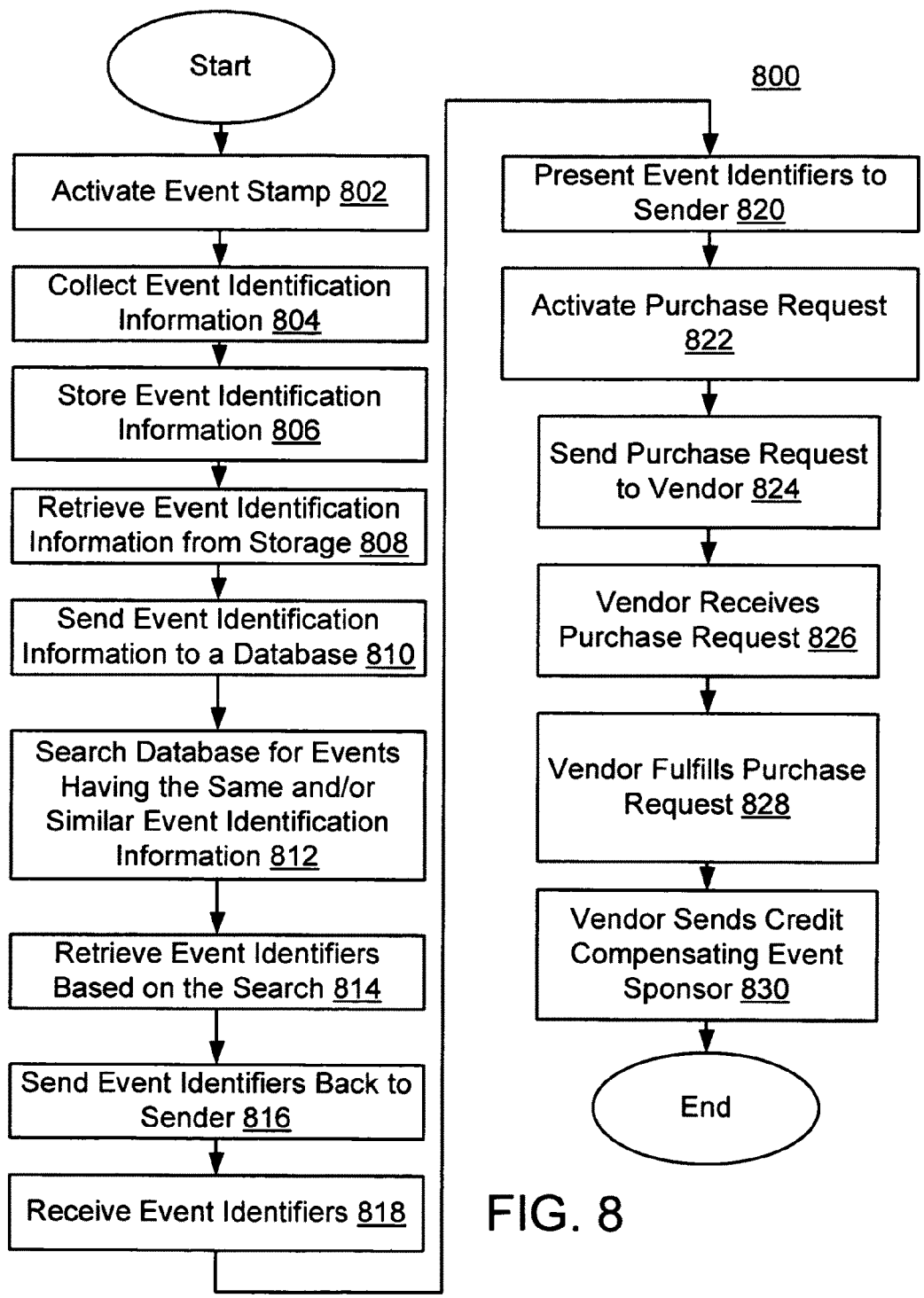
FIG. 8 shows a flowchart of an example of a method of using an event stamp.

FIG. 8 shows a flowchart of an example of a method 800 of using an event stamp. In step 802, an event function is activated. Step 802 may involve activating event functions associated with input for identification information 224, input for identification information 328, input system 504, and/or activating event stamp buttons 106, 107b, 109b, 404, and/or 704.

In step 804, event stamp information is collected, which may involve retrieving the time from a clock, retrieving GPS information, retrieving profile information from a broadcast of a radio, television or other broadcast segment, recording a portion of a broadcast segment, measuring and recording a frequency and/or station to which a tuner is set, taking a picture, recording a voice message, measuring and recording a temperature, measuring and recording an altitude, and/or measuring and recording a pressure. In an alternative embodiment, all or part of the event stamp information is entered manually in addition, or instead of, performing steps 802 and 804. In step 806, the event stamp information is stored, which may involve storing the event stamp information in memory system 218, 322, and/or 506.

In step 808, the event stamp information is retrieved from storage. For example, while the user is involved in some activity, the user merely activates the event stamp, and then at a later time when the user is not involved in any particular activity, the user retrieves candidate event information based on the event stamp information. Alternatively, step 806 may be performed automatically or manually immediately after collecting the candidate event information (for example is step 804), in which case the event stamp information may never be stored in long term storage. If the event stamp information is not stored in long term storage, step 806 may only involve storing the event stamp information is short term storage (e.g., in the cache of the processor) or step 806 and 808 may be skipped.

In step 810, the event stamp information is sent to a database. Step 810 may involve sending the event stamp information from listening device 104, network appliance 106, keychain 107a, and/or mobile phone 109a to website host 112, which may then be forwarded to an appropriate database, such as database 114, and/or to one or more other databases associated with broadcast sources 116-124, airports 126a-n, train stations 128a-n, taxis, restaurants, hair cutteries, other shops and/or forms of entertainment, and/or vendors associated with advertisements. Alternatively, the event stamp information may be manually or automatically transferred from listening device 104, keychain 107a, and/or mobile phone 109a to network appliance 106 (which may be a computer or mobile phone, for example) prior to sending the event stamp information to the appropriate database (the transfer may also be from a first mobile phone that has an event function, but that is not capable of accessing website host 112 or database 114, to a second mobile phone that does have access).

In step 812, the appropriate one or more databases are searched, which may involve automatically formulating and sending a database query to the appropriate database and searching the appropriate database via a database server based on the query. In step 814, candidate event information is retrieved based on the search of step 812. In step 816, the candidate event information is sent back to listening device 104, network appliance 106, keychain 107a, and/or mobile phone 109a. In the case of network appliance 106, mobile phone 109a or any other network appliance having a display, a webpage including candidate event information may be sent (the webpage may also include advertisements related to the event stamp information and/or the candidate event information and/or the current location of the event identification device with respect to the advertiser). Some examples of the candidate event information is found and discussed in conjunction with FIGS. 4 and 6. In step 818, the candidate event information (and possibly an associated webpage) are received by listening device 104, network appliance 106, keychain 107a, and/or mobile phone 109a. In step 820, the candidate event information (and possibly an associated webpage) is presented to the user on the display of the user's network appliance.

In step 822, the user initializes a purchase, which may be based on the candidate event information. Step 822 may involve the user reviewing the candidate information presented, deciding which candidate event information corresponds to the event of interest. Deciding which candidate event information corresponds to the event of interest may involve a significant amount of interaction between the user, the network appliance being used, website host 112 and/or the appropriate database. For example, the user may hear and/or view sample clips associated the candidate event information before deciding which candidate event information is of interest. As a further example, the user may be presented with the candidate event information for three candidate events having the closest time to the time associated with the event stamp information. However, the user may decide that none of the three candidate events are the events of interest, and request candidate event information for candidate event that are associated with other times that are not as close as to the time associated with the event stamp as the candidate event information originally presented. At the end of step 822, the user selects a purchase icon, such as links 422-a-e, therein initiating a purchase.

In step 824, in response to the user selecting the purchase icon, the request is sent to the vendor. In step 826, the vendor receives the request. In response, in step 828, the vendor determines the product requested and sends the product to the user, therein fulfilling the user's request. In step 830, the vendor determines through which source the user became interested in the product sold. For example, the vendor determines which radio station the user heard the song or on which television stations the user saw a program, and the vendor sends the source a payment. Alternatively a portion of the purchase price may go to website host 112, which may in turn send a payment to the source of the event, or the source of the event is compensated in another fashion. In yet another embodiment, no payment is sent to the source of the event. In an alternative embodiment and/or mode all or part of steps 820-826 may be performed automatically without user intervention.

In an embodiment, each of the steps of method 800 is a distinct step. In another embodiment, although depicted as distinct steps in FIG. 8, step 802-830 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Figure 9:
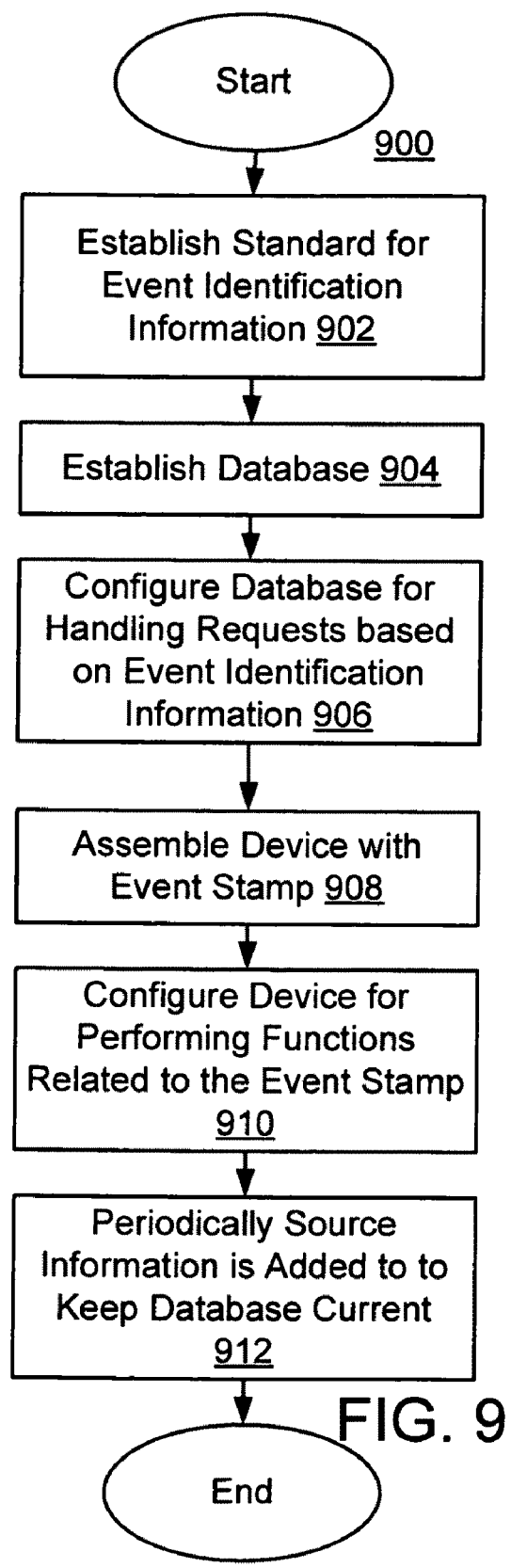
FIG. 9 is a flowchart of an example of a method for establishing event identification system of FIG. 1.

FIG. 9 is a flowchart of an example of a method 900 for establishing event identification system 100. In step 902, a standard may be established for event stamps. Having a standard for event stamps facilitates allowing a larger variety of participants than were no standard being used. By having a standard, each perspective participant may be reasonably sure of being capable of participating by conforming to the standard. The standard may include a minimal set of identifying pieces of information, an order in which the identifying pieces of information are stored in an event stamp, a location within a file or group of messages where the event stamp is stored and/or communicated. Different types of event stamps may have different standards. For example, event stamps for songs and programs may require a time, followed by a location, followed by a source of the event (e.g., a radio station or a television station). In contrast, the standard for a mode of transportation may include a time, followed by a location, where the location is a city or a street, followed by the type of transportation. Similarly, the standard for an advertisement may include a time, followed by where the advertisement was seen, heard, or otherwise observed (which may be a street, a form of transportation, a radio station, or a television station, followed by the type of transportation). Step 902 is optional, because event identification system 100 may be established without a standard for event stamps. For example, a proprietor may prefer not to have a publicly useable standard so that it is more difficult for competitors to compete. In step 904, a database is established (e.g., constructed or purchased) that for stores event data, such as database 114.

In step 906, the database is configured for handling requests for event information. For example, database 114 may be configured to automatically lookup retrieve and return event information in response to a request for information about an event. During step 906, database 114 may also be configured to automatically receive and/or request updates of information from a variety of vendors.

In step 908, identification devices, which may have event stamps, such as key chain 107a, mobile phone 109a, network appliance 106, and/or attachment 700 are constructed. If the identification device has an event stamp constructing the identification device includes installing and constructing the event stamp. In step 910, the identification devices are configured (e.g., programmed) for collecting the event stamp information, storing the event stamp information, retrieving the event stamp information, sending the event stamp information to a website host, receiving event information in reply, displaying the event information, sending a request to purchase items associated with the event, and/or receiving the purchased item.

In an embodiment, each of the steps of method 900 is a distinct step. In another embodiment, although depicted as distinct steps in FIG. 9, step 902-910 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

In general each of the embodiments and each aspect of each embodiment disclosed in this specification may be used together in any combination or separately from one another. Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A machine-implemented method comprising:
receiving event search information at a machine including at least a processor system having one or more processors and a memory, the machine being at least, or including at least a server, the machine being capable of identifying at least two different types of events, the sever being capable of receiving data from a wireless network, the event search information being in a format associated with an event stamp function that collects event stamp information including at least multiple event pieces of information for identifying an event; the event stamp information includes at least global positioning coordinates identifying a location associated with the event; the receiving resulting from a communicative coupling, via a communications link, to a network;

as a result of receiving the event search information, automatically launching a search on the server associated with the event identifying information of the event stamp function;

returning, by the processor system implementing one or more machine instructions stored in the memory, to a network appliance, search results including event information associated with the receiving; and sending, by the processor system, a message requesting a crediting of a sponsor of the event with a monetary compensation based at least in part on the event identifying information.

2. The machine-implemented method of claim 1, wherein the event search information includes at least a radio station identifier;
the event information is associated with a sound segment; and
the sponsor is the radio station that played the sound segment and that is associated with the radio station identifier.

3. The system of claim 1, wherein the time associated with the event being a time at which an event occurred.

4. The system of claim 1, wherein the multiple event identifying pieces of information include at least a date associated with the event.

5. The system of claim 1, wherein contents included in the multiple event identifying pieces of information are determined at least in part by a standard agreed upon by multiple independent organizations.

6. The system of claim 5, wherein the standard includes a minimal set of identifying pieces of information, an order in which the identifying pieces of information are stored in an event stamp, and a location within a file or group of messages where the event stamp is stored.

7. The system of claim 1, wherein the system further includes a database that stores information naming and identifying events.

8. The system of claim 7, wherein the database that stores information about a product or service associated with the event.

9. The system of claim 7, the database includes a correlation of restaurants and locations.

10. The system of claim 7, the database includes a correlation of restaurants and menus.

11. The system of claim 7, the database includes a correlation of commercial establishments and special offers.

12. The system of claim 11, the commercial establishments being restaurants.

13. The system of claim 1, wherein the multiple pieces of event identifying information includes at least information associated with a song being broadcasted.

14. The system of claim 1, wherein the multiple pieces of event identifying information includes at least information associated with a vehicle of transportation passing a certain location, and the event is the vehicle of transportation passing the certain location.

15. The system of claim 1, further comprising a tuner included within the network appliance communicatively coupled to a button that activates the event stamp function, wherein information about a broadcast source is determined based on the tuner.

16. The system of claim 1, wherein the network appliance is a keychain including at least the event stamp function, which is associated with a button, that is capable of recording event identifying information that includes at least a date, and a radio station identifier;

the keychain further including at least circuitry capable of locating a radio station, based on sounds being emitted from a listening device, associated with activating the event stamp function.

17. The system of claim 1, wherein the network appliance further includes at least a tuner for tuning to a broadcast source of interest, an output, including at least a speaker and a display, for outputting the broadcast for observation by a user, a button, which when pressed activated the event stamp function; the button on the network appliance includes at least a cylindrical component that rotates, wherein rotating the cylindrical component cause a scrolling through information displayed via the display, the network appliance is one of one or more network appliances, and the system further comprises:

one or more broadcast sources for producing a broadcast; a network;

a website host communicatively coupled with the network, wherein the website host is configured for displaying a website via which a user may identify an event of interest and purchase a product associated with the event;

a database storing event information, the database communicatively coupled with the website host via which the website host and the database communicate regarding event information therein facilitating displaying the event information on the website; and a vendor website host communicatively coupled to the network via which the product is purchased based on interactions between the user and the website.

18. The system of claim 17, wherein at least one of the one or more network appliances is a mobile phone.

19. The system of claim 17, wherein the database and the website host communicate via the network.

20. The system of claim 17, wherein the database includes at least one or more machine readable media that store at least one or more playlists of radio stations, one or more locations of the radio stations, one or more identifiers of the radio stations, and one or more broadcast frequencies of radio stations, wherein the one or more playlists, one or more locations, one or more identifiers, and one or more broadcast frequencies are correlated with one another.

21. The system of claim 17, at least one of the types of event is not a broadcast.

22. The system of claim 1, further comprising:

a button on the network appliance, which when pressed initialized the event stamp function; the collection of multiple identifying pieces of information also includes information identifying a store, upon which the search results are based and for which the search is conducted.

23. The system of claim 1, the system implementing a method comprising the network appliance receiving a promotional offer from the store.

24. The system of claim 23, the store being a restaurant.

25. The machine-implemented method of claim 1, the search being a search for a location.

26. The machine-implemented method of claim 1, the search being a search for a mode of transportation.

27. The machine-implemented method of claim 1, the search being a search for an advertisement.

28. A system comprising:

a network appliance for returning search results; the network appliance including at least an event stamp function on the network appliance, which initializes a collection of multiple identifying pieces of information, upon which the search results are based, the event stamp information includes at least global positioning coordinates identifying a location associated with the event, wherein the network appliance automatically launches a search associated with the event stamp function being initialized; wherein the system is capable of identifying at least two different types of events, and wherein the multiple pieces of identifying information includes at least information associated with an advertisement being displayed;

a memory that at least temporarily stores the event stamp information collected as a result of initiating the event stamp function;

one or more machine instructions for causing the processor to send a message to a server to requesting the server to perform a search associated with activating the event stamp function;

a receiver for receiving global positioning system coordinates; and a communications link for communicatively coupling the network appliance for transferring the event stamp information;

the network appliance running one or more machine instructions causing a method to be implemented, the method including at least receiving a link for purchasing a product associated with the advertisement.

29. The system of claim 28, the advertisement being displayed does not originate from a broadcast.

30. The system of claim 28, the advertisement being a bill board.

31. The system of claim 28, the advertisement being attached to a stationary object.

32. The system of claim 28, the advertisement being attached to a moving vehicle.

33. A system comprising: a network appliance for returning search results;

a button on the network appliance, which when pressed activates an event stamp function that initializes a collection of multiple event identifying pieces of event stamp information, upon which the search results are based, the network appliance automatically sends a message to a server causing a launching of a search associated with the event stamp function being initialized; wherein the system is capable of identifying at least two different types of event, the event stamp information includes at least a time associated with an event, and global position coordinates identifying a location associated with the event, the system further comprising one or more buttons communicatively coupled to the network appliance that affect a mode of operation associated with an event stamp;

and the network appliance includes at least:

a memory at least temporarily storing the event stamp information collected as a result of initiating the event stamp function;

one or more machine instructions for causing the processor to send a message to a server to initialize a search associated with activating the event stamp function;

a receiver for receiving global positioning system coordinates; and a communications link for communicatively coupling the network appliance for transferring the event stamp information.

34. The system of claim 33, the event stamp is a collection of multiple event identifying pieces of information; the button which when pressed initializes the collection is an event stamp button; the affect on the mode of operation includes at least to change from a first mode of operation to a second mode of operation associated with the event stamp button; the first mode of operation collects information about a first type of event and the second mode of operation collects information about a second type of event.

35. The system of claim 34, at least one of the first type of event and the second type of event is not a broadcast.

36. A machine-implemented method comprising:
receiving event search information at a machine including a processor system having one or more processors and a memory, the machine being at least, or including at least, a network appliance, the event search information being information for searching for an event, the machine being capable of identifying at least two different types of events; the receiving of the event search information including
initializing at least an event stamp function resident on the machine, which initializes a collection of multiple pieces of information, the multiple pieces of information of the event stamp including at least a time associated with an event;
as a result of the collection of the multiple pieces of information, receiving global positioning system coordinates, via a receiver, the global positioning coordinates identifying a location associated with where the initializing took place;
at least temporarily storing the multiple pieces of information collected as a result of initializing the event stamp function;
in association with the receiving of the event search information, the network appliance automatically sending a message to a server, the message including a request for launching a search on the server, the search being associated with the event stamp function that was initialized; the automatically sending of the message to the server including at least causing a communicative coupling, via a communications link, of the network appliance to a network for transferring the event stamp information to the server; and
in association with the receiving of the event search information,
returning, by the processor system implementing one or more machine instructions stored in the memory, search results resulting from the request for launching the search, the search results including at least event information about a first event corresponding to the event search information.

37. The machine-implemented method of claim 36, wherein the event search information includes at least a first time associated with the event; the event information about the event corresponding to the event search information includes information about a first event associated with the first time; and the one or more other events include at least a second event that is juxtaposed, on an event list being searched, to the first event.

38. A system comprising:
a network appliance for returning search results;
an event stamp function on the network appliance, which initializes a collection of multiple event identifying pieces of information upon which the search results are based, the event stamp information includes at least global positioning coordinates identifying a location associated with the event,
wherein the system is capable of identifying at least two different types of events, and the network appliance includes at least:
a memory at least temporarily storing the event stamp information collected as a result of initiating the event stamp function;
one or more machine instructions stored in the memory, when implemented, causing a processor of the network appliance to automatically send a message to a server requesting a launching of a search associated with the event stamp function being initialized;
a receiver for receiving global positioning system coordinates; and
a communications link for communicatively coupling the network appliance for transferring the event stamp information.

39. The system of claim 38, the memory storing one or more machine instructions for generating an icon, the event stamp function being activated via the icon.

40. The system of claim 38, the memory storing one or more machine instructions for generating a menu item that is selected using cursor control buttons, the event stamp function being activated selecting the menu item with a cursor control button.

41. A method comprising:
automatically generating, by a processor system of a network appliance having one or more processors, event stamp information associated with an event stamp function of the network appliance, the event stamp information including location information for identifying an event;
at least temporarily storing the event stamp information in a memory system of the network appliance;
sending, by the processor system, event stamp information from the network appliance, through a communications link for communicatively coupling the network appliance to a network for coupling with a server;
in response to the sending, receiving at the network appliance from the server results of a search based on the event stamp information; wherein the event stamp information includes at least location information identifying a location associated with the event; and
ordering, by the network appliance, a product or a service based on results of the search.

42. The method of claim 41, the product or service being a ride on a taxi.

43. The method of claim 41, the product or service being a ticket for a mode of transportation.

44. The method of claim 41, the product or service being a ticket for a mode of entertainment.

45. A machine-implemented method comprising:
receiving event identifying information at a machine including a processor system having one or more processors and a memory, the machine being at least, or including at least, a network appliance; and
in association with the receiving of the event identifying information,
returning, by the processor system implementing one or more machine instructions stored in the memory, event information about an event corresponding to the event identifying information, and
returning, by the machine, event information about one or more other events having at least some event identifying information that does not match at least some of the event identifying information that was received;

the returning of the event information about the event and about the one or more other events including at least returning search results, via the network appliance;

the receiving of the event identifying information including initializing at least an event stamp function resident on the machine, which initializes a collection of multiple event identifying pieces of information upon which the search results are based, the returning of the search results being in response to the network appliance automatically sending a message to a server that launches a search on the server, the search being associated with the event stamp function being initialized; wherein the machine is capable of identifying at least two different types of events; the event stamp function causes event stamp information to be collected, the event stamp information includes at least a time associated with an event, and global positioning coordinates identifying a location associated with the event;

the method also includes
 at least temporarily storing in a memory of the machine the event stamp information collected as a result of initiating the event stamp function; and
 receiving global positioning system coordinates, via a receiver; and
the automatically sending of the message to the server including at least causing a communicative coupling, via a communications link, of the network appliance to a network for transferring the event stamp information to the server.

46. A machine-implemented method comprising:

receiving event identifying information at a machine including a processor system having one or more processors and a memory, the machine being at least, or including at least, a network appliance;

in association with the receiving of the event identifying information,
 returning, via the processor system implementing one or more machine instructions stored in the memory, event information about an event corresponding to the event identifying information, and
 returning, via the machine, event information about one or more other events having at least some of the event identifying information, wherein the event identifying includes at least a first time associated with the event;
 the event information about the event corresponding to the event identifying information includes information about a first event associated with the first time; and
 the one or more other events include at least a second event that is juxtaposed in time to the first event, and an entity running the first event is the entity running the second event;

the returning of the event information about the event and about the one or more other events including at least returning search results, via the network appliance of the machine;

the receiving of the event identifying information including at least an event stamp function resident on the machine initializing a collection of multiple event identifying pieces of information upon which the search results are based, the returning of the search results being in response to the network appliance automatically sending a message to a server that launches a search on the server associated with the event stamp function being initialized; wherein the machine is capable of identifying at least two different types of events, the network appliance is capable of receiving data wirelessly, the event stamp function causes event stamp information to be collected, the event stamp information includes at least a time associated with an event, and global positioning coordinates identifying a location associated with the event, the method also includes at least temporarily storing, in the memory of the machine, the event stamp information collected as a result of initiating the event stamp function;
 receiving, by a receiver of the machine, global positioning system coordinates; and
 the automatically sending of the message to the server including at least causing a communicative coupling, via a communications link, of the network appliance to a network for transferring the event stamp information.

47. A machine-implemented method comprising: receiving event identifying information at a machine including a processor system having one or more processors and a memory, the machine being at least, or including at least a network appliance; in associations with receiving the event identifying information, returning, by the processor system implementing one or more machine instructions stored in the memory, event information about an event corresponding to the event identifying information, and returning, by the machine, event information about one or more other events having at least some of the event identifying information that was received, wherein the event identifying information includes at least a first time associated with the event;
 the event information about the event corresponding to the event identifying information includes information about a first event associated with the first time; and
 the one or more other events include at least a second event that is of a second time that is earlier than the first time, and a third event that is of a third time that is later than the first time,
 the second event and the third event being run by the entity that runs the first event;

the returning of the event information about the event and about the one or more other events including at least returning search results, via the network appliance;

the receiving of the event identifying information including at least initializing an event stamp function resident on the machine, which initializes a collection of multiple event identifying pieces of information upon which the search results are based;

the returning of the search results being in response to the network appliance automatically launching a search associated with the event stamp function being initialized; wherein the machine is capable of identifying at least two different types of events, the network appliance is capable of receiving data wirelessly; the event stamp function causes event stamp information to be collected, the event stamp information includes at least a time associated with an event, and global positioning coordinates identifying a location associated with the event, the method also includes at least temporarily storing, in the memory of the machine, the event stamp information collected as a result of initiating the event stamp function; and receiving, by a receiver of the machine, global positioning system coordinates; and the automatically sending of the message to the server including at least causing a communicative coupling, via a communications link, of the network appliance to a network for transferring the event stamp information to the server.

48. A machine-implemented method comprising:
receiving event identifying information at a machine including at least a processor system having one or more processors and a memory, the machine being at least, or including at least a server;
returning, by the processor system implementing one or more machine instructions stored in the memory, event information associated with the receiving; and
sending, by the processor system, a message causing a crediting of a sponsor of the event with a monetary compensation based at least in part on the event identifying information;
the returning of the event information including at least retuning search results, via the server, to a network appliance;
the receiving of the event identifying information including at least receiving the event identifying information in a format associated with an event stamp function that collects event stamp information including at least multiple event identifying pieces of information upon which the search results are based,
as a result of receiving the event identifying information automatically launching a search on the server associated with the event identifying information of the event stamp function; wherein the machine is capable of identifying at least two different types of events, the sever is capable of receiving data from a wireless network, the event stamp information includes at least a time associated event, and global positioning coordinates identifying a location associated with the event, the method also includes
at least temporarily storing, in the memory of the machine, the event stamp information collected as a result of initiating the event stamp function; and
by a receiver of the machine, global positioning system coordinates; and
the automatically sending of the message to the server including at least causing a communicative coupling, via a communications link, of the network appliance for transferring the event stamp information.

49. A server system comprising:
a network appliance for returning search results;
an event stamp function on the network appliance, which initializes a collection of multiple identifying pieces of information, upon which the search results are based,
wherein the network appliance automatically launches a search associated with the event stamp function being initialized; wherein the system is capable of identifying at least two different types of events, and
wherein the multiple pieces of identifying information includes at least information associated with an advertisement being displayed; the network appliance running one or more machine instructions causing a method to be implemented, the method including at least receiving a link for purchasing a product associated with the advertisement;
and the network appliance includes at least;
the event stamp function, which causes event stamp information to be collected, the event stamp information includes at least a time associated with an event, and global positioning coordinates identifying a location associated with the event,
a memory at least temporarily storing the event stamp information collected as a result of initiating the event stamp function;
one or more machine instructions for causing the processor to send a message to a server to initialize a search associated with activating the event stamp function;
a receiver for receiving global positioning system coordinates; and
a communications link for communicatively coupling the network appliance for transferring the event stamp information.

50. A system comprising;
a network appliance for returning search results;
an event stamp function on the network appliance, which initializes a collection of multiple event identifying pieces of information upon which the search results are based, wherein the network appliance automatically sends a message to a server that causes a launching of a search associated with the event stamp function being initialized;
wherein the system is capable of identifying at least two different types of events, and the network appliance includes at least:
the event stamp function, which causes event stamp information to be collected, the event stamp information includes at least a time associated with an event, and global positioning coordinates identifying a location associated with the event,
a memory at least temporarily storing the event stamp information collected as a result of initiating the event stamp function;
one or more machine instruction for causing a processor to initialize a search associated with activating the event stamp function;
a receiver for receiving global positioning system coordinates; and
a communications link for communicatively coupling the network appliance for transferring the event stamp information.

51. A machine-implemented method comprising:
receiving event identifying information at a machine including a processor system having one or more processors and a memory, the machine being at least, or including at least, a network appliance; and
associated with receiving the event identifying information,
returning, by the processor system, event information about an event corresponding to the event identifying information, and
returning, by the machine, event information about one or more other events having at least some event identifying information that does not match at least some of the event identifying information that was received;
the returning of the event information about the event and about the one or more other events including at least returning search results, via the network appliance;
the receiving of the event identifying information including at least an event stamp function resident on the machine initializing a collection of multiple event identifying pieces of information upon which the search results are based,
the returning of the search results being in response to the network appliance automatically sending a message to a server that launches a search on the server, the search being associated with the event stamp function being initialized;
the method also including
determining location information identifying a location associated with the event, via the network appliance;

the event stamp function causes event stamp information to be collected, the event stamp information includes at least the location information identifying the location associated with the event; and at least temporarily storing in a memory of the machine the event stamp information collected as a result of initiating the event stamp function; and the automatically sending of the message to the server including at least causing a communicative coupling, via a communications link, of the network appliance to a network for transferring the event stamp information to the server.

52. A non-transitory computer readable medium storing thereon one or more machine instructions, which when implemented cause a processor system to carry out a method comprising:

receiving event identifying information at a machine including a processor system having one or more processors and a memory, the machine being at least, or including at least a network appliance; and in association with receiving the event identifying information, returning, by the processor system, event information about an event corresponding to the event identifying information, and returning, by the machine, event information about one or more other events having at least some event identifying information that does not match at least some of the event identifying information that was received;

the returning of the event information about the event and about the one or more other events including at least returning search results, via the network appliance;

the receiving of the event identifying information including at least initializing an event stamp function resident on the machine, which initialized a collection of multiple event identifying pieces of information upon which the search results are based, the returning of the search results being in response to the network appliance automatically sending a message to a server that launches a search on the server, the search being associated with the event stamp function being initialized;

the method also including determining location information identifying a location associated with the event, via the network appliance; and the event stamp function causes event stamp information to be collected, the event stamp information includes at least the location information identifying the location associated with the event; and at least temporarily storing in a memory of the machine the event stamp information collected as a result of initiating the event stamp function; and the automatically sending of the message to the server including at least causing a communicative coupling, via a communications link, of the network appliance to a network for transferring the event stamp information to the server.

53. A machine-implemented method comprising:

receiving event identifying information at a machine including at least a processor system having one or more processors and a memory, the machine being at least, or including at least a server;

returning, by the processor system, event information associated with the receiving; and sending, by the processor system, a message including an advertisement based on the event identifying information;

the returning of the event information including at least sending search results from the server to a network appliance;

the receiving of the event identifying information including at least receiving the event identifying information in a format associated with an event stamp function that collects event stamp information including at least multiple event identifying pieces of information upon which the search results are based, as a result of receiving the event identifying information automatically launching a search on the server associated with the event identifying information of the event stamp function; wherein the server is capable of receiving data that originated from a wireless network; the event stamp information includes at least location information identifying a location associated with the event; and at least temporarily storing, in the memory of the machine, the event stamp information collected as a result of initiating the event stamp function; and the automatically sending of the message to the server including at least causing a communicative coupling, via a communication link, of the network appliance for transferring the event stamp information.

54. A server system comprising:

a processor system having one or more processors;

a communications link for communicatively coupling the server to a network; and a memory system storing one or more machine instructions for processing messages automatically generated by an event stamp function of a network appliance, the one or more instructions cause the server to carry out a method including at least receiving, by the processor system, event stamp information from the network appliance, in response to the receiving, automatically launching a search based on the event stamp information; wherein the event stamp information includes at least location information identifying a location associated with the event; and sending, by the processor system, results of the search, which include information about the event, and a promotional offer for a store based on the location information.

55. A network appliance comprising:

a processor system having one or more processors;

a communications link for communicatively coupling the network appliance to a network; and a memory system storing one or more machine instructions for automatically generating messages associated with an event stamp function of the network appliance, the one or more instructions cause the network appliance to carry out the following method sending, by the processor system, event stamp information from the network appliance to a server, in response to the sending, receiving from the server results of a search based on the event stamp information and promotional information from a store based on the location information; wherein the event stamp information includes at least location information identifying a location associated with the event.

56. A new method comprising:

automatically generating, by a processor system of a network appliance having one or more processors, event stamp information associated with an event stamp function of the network appliance, the event stamp information including location information for identifying an event;
at least temporarily storing the event stamp information in a memory system of the network appliance;
sending, by the processor system, event stamp information from the network appliance, through a communications link for communicatively coupling the network appliance to a network for coupling with a server;
in response to the sending, receiving at the network appliance from the server results of a search based on the event stamp information and promotional information for a store based on the location information; wherein the event stamp information includes at least location information identifying a location associated with the event.

57. A non-transitory computer readable medium storing thereon one or more machine instructions, which when implemented cause a processor system to carry out a method comprising:
automatically generating, by a processor system of a network appliance having one or more processors, event stamp information associated with an event stamp function of the network appliance, the event stamp information including location information for identifying an event;
at least temporarily storing the event stamp information in a memory system of the network appliance;
sending, by the processor system, event stamp information from the network appliance, through a communications link for communicatively coupling the network appliance to a network for coupling with a server;
in response to the sending, receiving at the network appliance from the server results of a search based on the event stamp information and promotional information for a store based on the location information; wherein the event stamp information includes at least location information identifying a location associated with the event.

58. A machine-implemented method comprising:
receiving event search information at a machine including a processor system having one or more processors and a memory, the machine being at least, or including at least a network appliance, the event search information being information for searching for an event, the machine being capable of identifying at least two different types of events and receiving information wirelessly; the receiving of the event search information including
  initializing at least an event stamp function resident on the machine, which initializes a collection of multiple pieces of information, the multiple pieces of information of the event stamp including at least a time associated with an event;
  as a result of the collection of the multiple pieces of information, receiving global positioning system coordinates, via a receiver, the global positioning coordinates identifying a location associated with where the initializing took place;
at least temporarily storing the multiple pieces of information collected as a result of initializing the event stamp function;
in association with the receiving of the event search information, the network appliance automatically sending a message to a server, the message including a request for launching a search on the server, the search being associated with the event stamp function that was initialized; the automatically sending of the message to the server including at least causing a communicative coupling, via a communications link, of the network appliance to a network for transferring the event stamp information to the server; and
in association with the receiving of the event search information,
  returning, via the processor system implementing one or more machine instructions stored in the memory, search results resulting from the request for launching the search, the search results including at least event information about a first event that is being run by an entity, the first event having a first time, the event information about the first event corresponding to the event search information, and
  event information about one or more other events having at least some of the event search information, including at least a second event that is juxtaposed in time to the first event, and that is being run by the entity running the first event.

59. A machine-implemented method comprising:
receiving event search information at a machine including a processor system having one or more processors and a memory, the machine being at least, or including at least a network appliance, the event search information being information for searching for an event, the machine being capable of identifying at least two different types of events and receiving information wirelessly; the receiving of the event search information including
  initializing at least an event stamp function resident on the machine, which initializes a collection of multiple event identifying pieces of information upon which the search results are based, the multiple pieces of information including at least a time associated with the initializing;
  as a result of the collection of the multiple pieces of information, receiving global positioning system coordinates, via a receiver, the global positioning coordinates identifying a location associated with where the initializing took place;
at least temporarily storing the multiple pieces of information collected as a result of initializing the event stamp function;
in association with the receiving of the event search information, the network appliance automatically sending a message to a server the message including a request for launching a search on the server, the search being associated with the event stamp function being initialized; the automatically sending of the message to the server including at least causing a communicative coupling, via a communications link, of the network appliance to a network for transferring the event stamp information to the server; and
in association with receiving the event search information,
  returning, by the processor system of the network appliance implementing one or more machine instructions stored in the memory, search results resulting from the request for launching the search, the search results including at least
    event information about a first event corresponding to the event search information and two or more other events,
    the event information about the first event associated being associated a first time; and
    the one or more other events include at least
      a second event that is associated with a second time that is earlier than the first time, and a third event that is of a third time that is later than the first time, the second event and the third event being run by the entity that runs the first event.

60. A machine-implemented method comprising:

receiving event search information at a machine including a processor system having one or more processors and a memory, the machine being at least, or including at least a network appliance, the receiving of the event search information including at least an event stamp function resident on the machine initializing a collection of event stamp information, which includes multiple event identifying pieces of information upon which the search is based; the event stamp function causes event stamp information to be collected, the event stamp information includes at least location information identifying a location associated with the event;

at least temporarily storing in a memory of the machine the event stamp information collected as a result of initiating the event stamp function;

associated with receiving the event search information,
the network appliance automatically sending a message to a server that requests the server to launch a search on the server, the search being associated with the event stamp function being initialized, the automatically sending of the message to the server including at least causing a communicative coupling, via a communications link, of the network appliance to a network for transferring the event stamp information to the server;
returning, by the processor system of the network appliance, search results including at least
event information about an event corresponding to the event search information, and
event information about one or more other events having at least some event identifying information that does not match at least some of the event search information that was received.

61. A computer readable medium storing thereon one or more machine instructions, which when implemented cause a processor system to carry out a method comprising:

receiving event search information at a machine including a processor system having one or more processors and a memory, the machine being at least, or including at least a network appliance, the receiving of the event search information including at least an event stamp function resident on the machine initializing a collection of event stamp information, which includes multiple event identifying pieces of information upon which the search is based; the event stamp function causes event stamp information to be collected, the event stamp information includes at least location information identifying a location associated with the event;

at least temporarily storing in a memory of the machine the event stamp information collected as a result of initiating the event stamp function; and in association with receiving the event search information,
the network appliance automatically sending a message to a server that requests the server to launch a search on the server, the search being associated with the event stamp function being initialized, the automatically sending of the message to the server including at least causing a communicative coupling, via a communications link, of the network appliance to a network for transferring the event stamp information to the server;
returning, by the processor system, of the network appliance, search results including at least
event information about an event corresponding to the event identifying information, and
event information about one or more other events having at least some event identifying information that does not match at least some of the event identifying information that was received.

62. A machine-implemented method comprising:

receiving event identifying information at a machine including at least a processor system having one or more processors and a memory, the machine being at least, or including at least a server; the receiving of the event identifying information including at least receiving the event search information in a format associated with an event stamp function that collects event stamp information including at least multiple event identifying pieces of information, as a result of receiving the event search information automatically launching a search on the server associated with the event search information of the event stamp function; wherein the sever is capable of receiving data that originated from a wireless network; the event stamp information includes at least location information identifying a location associated with the event;

returning, from the processor system of the server, to the network search results including at least event information based on the search; and sending, by the processor system, a message including an advertisement based on the event search information the sending causing a communicative coupling, via a communications link, of the network appliance for transferring the advertisement.

63. A method comprising:

automatically generating, by a processor system of a network appliance having one or more processors, event stamp information associated with an event stamp function of the network appliance, by at least automatically collecting location information associated with a location of the network appliance, the event stamp information including location information;

at least temporarily storing the event stamp information in a memory system of the network appliance;

sending, by the processor system, the event stamp information from the network appliance, through a communications link for communicatively coupling the network appliance to a network for coupling with a server;

in response to the sending, receiving at the network appliance from the server results of a search based on the event stamp information; wherein the search results includes at least location information identifying a location associated with an establishment based on the location associated with the network appliance.

* * * * *